Nov. 20, 1956 J. C. BELLAMY 2,771,596

METHOD AND APPARATUS FOR RECORDING AND REPRODUCING DATA

Filed June 2, 1950 8 Sheets-Sheet 1

INVENTOR.
John C. Bellamy
BY
Thiess, Olson & Mecklenburger
Attys.

Nov. 20, 1956 J. C. BELLAMY 2,771,596

METHOD AND APPARATUS FOR RECORDING AND REPRODUCING DATA

Filed June 2, 1950 8 Sheets-Sheet 2

INVENTOR.
John C. Bellamy
BY Theiss, Olson & Mecklenburger
Attys.

Nov. 20, 1956 J. C. BELLAMY 2,771,596

METHOD AND APPARATUS FOR RECORDING AND REPRODUCING DATA

Filed June 2, 1950 8 Sheets-Sheet 3

INVENTOR.

John C. Bellamy

BY Thiess, Olson & Mecklenburger.

Attys.

METHOD AND APPARATUS FOR RECORDING AND REPRODUCING DATA

Filed June 2, 1950

INVENTOR.
John C. Bellamy
BY Thiess Olson & Mecklenburger
Attys.

METHOD AND APPARATUS FOR RECORDING AND REPRODUCING DATA

INVENTOR.
John C. Bellamy
BY Thiess Olson + Mecklenburger
Attys.

METHOD AND APPARATUS FOR RECORDING AND REPRODUCING DATA

Filed June 2, 1950

INVENTOR.
John C. Bellamy
BY Thiess, Olson & Mecklenburger
Attys.

Nov. 20, 1956 J. C. BELLAMY 2,771,596

METHOD AND APPARATUS FOR RECORDING AND REPRODUCING DATA

Filed June 2, 1950 8 Sheets-Sheet 7

INVENTOR.
John C. Bellamy
BY Thiess, Olson & Mecklenburger
Attys.

INVENTOR.
John C. Bellamy.
BY Wing, Olson & Mecklenburger
Attys.

United States Patent Office 2,771,596

Patented Nov. 20, 1956

2,771,596

METHOD AND APPARATUS FOR RECORDING AND REPRODUCING DATA

John C. Bellamy, Chicago, Ill., assignor to Cook Electric Company, Chicago, Ill., a corporation of Illinois Application June 2, 1950, Serial No. 165,844

31 Claims. (Cl. 340—177)

This invention reates to a method of, and apparatus for, recording and reproducing data or information and identification thereof, particularly to such recording and transcribing and identifying where large amounts of data or information, for example instrument outputs, are to be recorded in one place and reproduced into a readily readable form at another place with a minimum of manual effort.

In many instances of research or making of studies and analyses, it is characteristic that a large number of readings of a large number of instruments must be taken, these frequently being taken at realtively short intervals of time. The operating space into which men and recording equipment may be placed is often very limited and the nature of the problems being investigated requires high accuracy in the sensing of the data as well as in the recording and reproducing thereof.

One instance of a problem of the character indicated is that of investigating the temperature at different points of the wing surface of an airplane as that airplane moves through a storm area or freezing atmospheric conditions, the problem being to determine the precise temperature condition of the airplane wing surface as ice beings to form thereon. For such an investigation there may be as many as 600 thermocouples attached to different parts of the wing surface, a reading of each thermocouple may be desired every minute or oftener, and the accuracy of recording may have to be within one quarter of a percent. The limitations of space in an airplane, however large, require that a limited number of recording instruments be utilized and that these instruments function with a minimum of human attention.

After a large number of data, whether instrument outputs, readings, or otherwise, have been taken and exist in the form of records of some type, such for example as magnetic indications on magnetic tapes or punched holes in other tapes, it may become a monumental task to transcribe or reproduce the data in this form into a usable form whether these latter take the shape of tabulated values or plotted curves, etc. Thus, if each sample of data, after recording, is to be sensed in some manner, such as by a magnetic reproducer, and noted by a human operator, it would take many persons many months to record the results of one test.

Accordingly, it is a further object of the invention to provide an improved method of, and apparatus for, recording information, such for example as instrument outputs on a medium in a rapid manner and with high accuracy.

It is a further object of the invention to provide an improved method of, and apparatus for, recording information as indicated and for recording at the same time the identification of the information.

It is a further object of the invention to provide an improved method of, and apparatus for, reproducing in a rapid manner and with high accuracy, into readily readable form on a medium, information or data which has previously been recorded on a different medium.

It is a further object of the invention to provide an improved method of, and apparatus for, reproducing data as indicated and for reproducing identification of the data at the same time.

Recording instrument readings in terms of the frequency of an alternating voltage; that is, recording a signal having the specified frequency on a magnetic tape, reproducing the instrument readings by sensing the signal frequencies recorded on the tapes, and plotting a graph of the instrument values, is shown and claimed in the application Serial No. 55,358, filed October 19, 1948, James Robert Downing, now Patent No. 2,714,202 dated July 26, 1955, and assigned to the same assignee as the present application. Frequency changes in apparatus of the character involved in the Downing application are difficult to detect with sufficient accuracy, particularly in view of the fact that the speed of the recording apparatus and of the reproducing apparatus is a factor involved.

Accordingly, it is a further object of the invention to provide improved apparatus of the character described wherein high accuracy is obtained and the changes or variations in speed of the recording and reproducing apparatus are of no substantial effect.

Further objects and advantages of the invention will become apparent as the description proceeds.

In carrying out the invention in one form, a method of recording data is provided which comprises the steps of, providing a signal corresponding to the data value, generating pulses at a uniform rate, comparing the signal from a time zero with a second signal varying linearly from a predetermined positive value to an equal negative value, recording the pulses spaced along a medium beginning at the time zero, and stopping recording of the pulses when the combined value of the compared signals is zero.

In carrying out the invention in another form, a method of recording and reproducing data is provided which comprises the steps of converting the data into a series of pulses corresponding to the value thereof, recording the series of pulses on a medium, detecting the pulses on the medium and counting the number thereof.

In carrying out the invention in another form, apparatus for recording data is provided which comprises, means for sensing the value of the data in terms of voltage, means for recording discrete effects on a medium, means for cyclically sweeping through or scanning the voltage at the sensing means with a source of voltage which varies linearly from a predetermined positive value to an equal negative value to compare the sweep voltage and the data voltage, and means for initiating recording by the recording means at the beginning of a sweep cycle and terminating recording when the combined value of the compared voltages is zero.

In carrying out the invention in another form, there is provided apparatus for reproducing recorded data, including means for sensing the pulses previously recorded on a medium, means for counting the number of the recorded pulses, and means for recording an effect on another medium which corresponds to the number of pulses originally recorded.

For a more complete understanding of the invention, reference should be had to the accompanying drawings in which.

Figure 9:
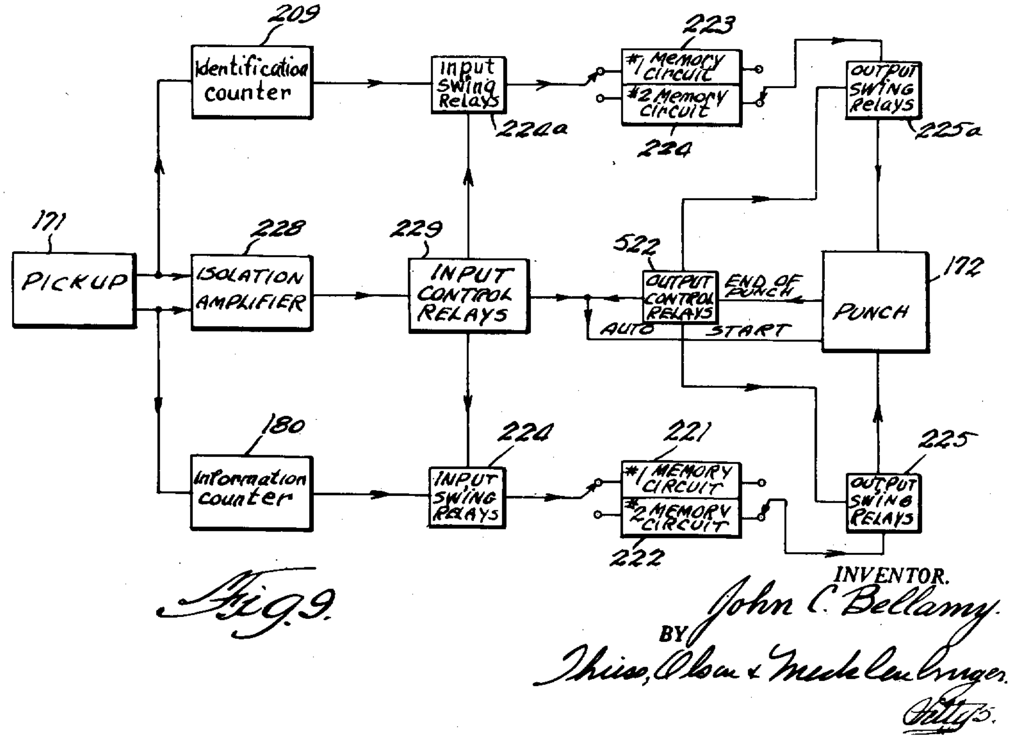
Fig. 9 is a block diagram of structure embodying the reproducing or transcribing apparatus of the invention and for carrying out the method thereof.
Figure 10A:
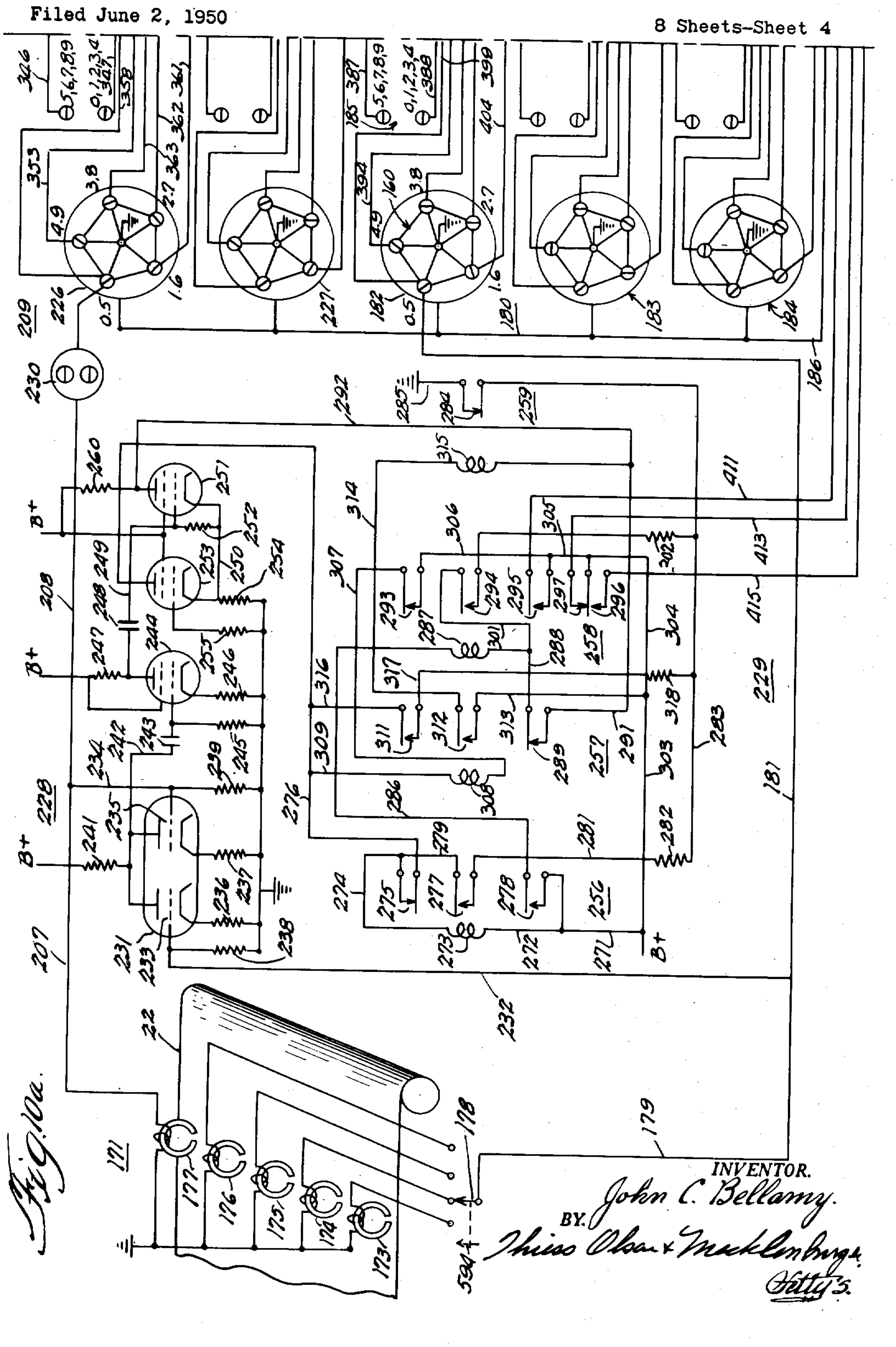
Figure 10B:
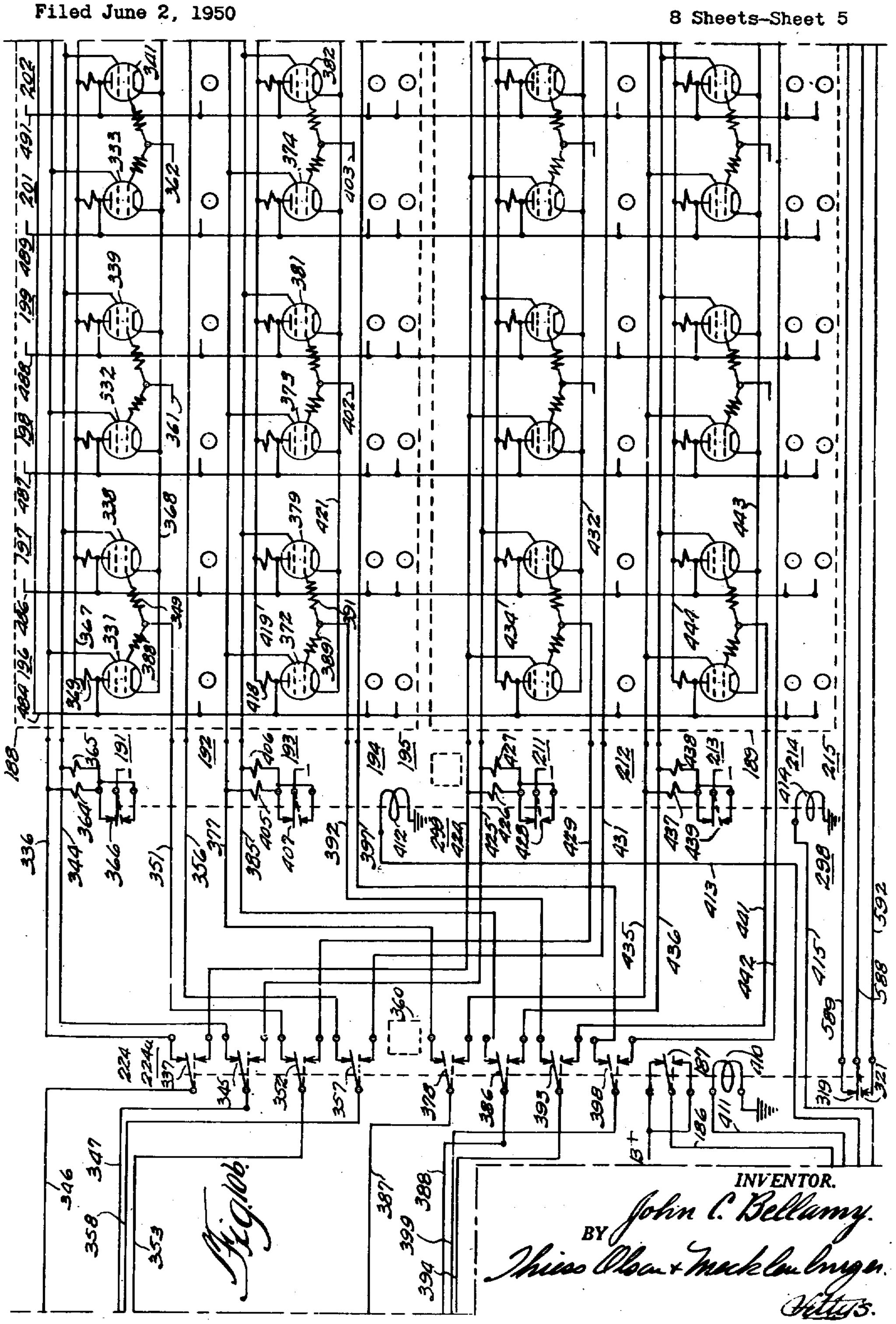
Figure 10C:
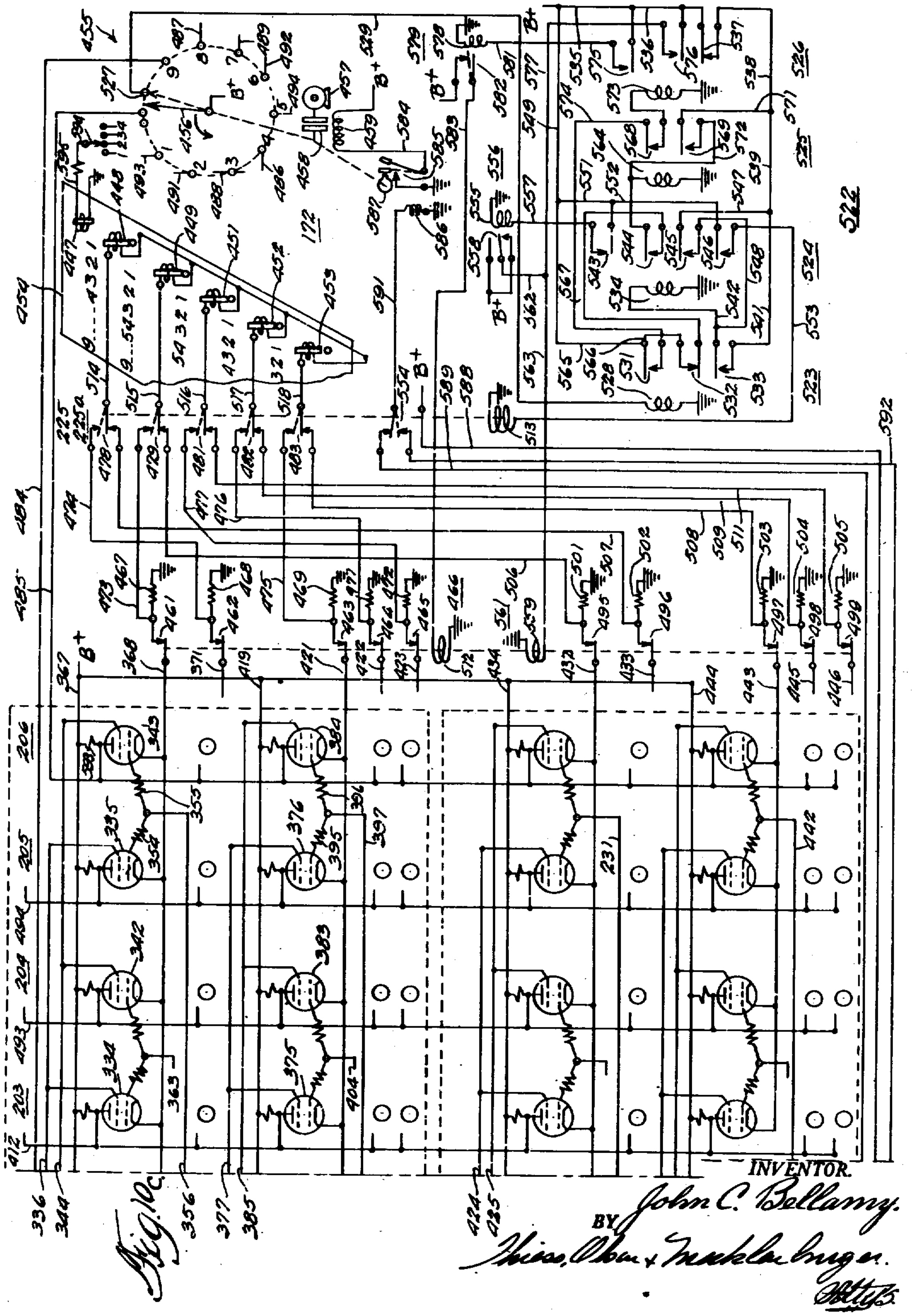
Figure 11:
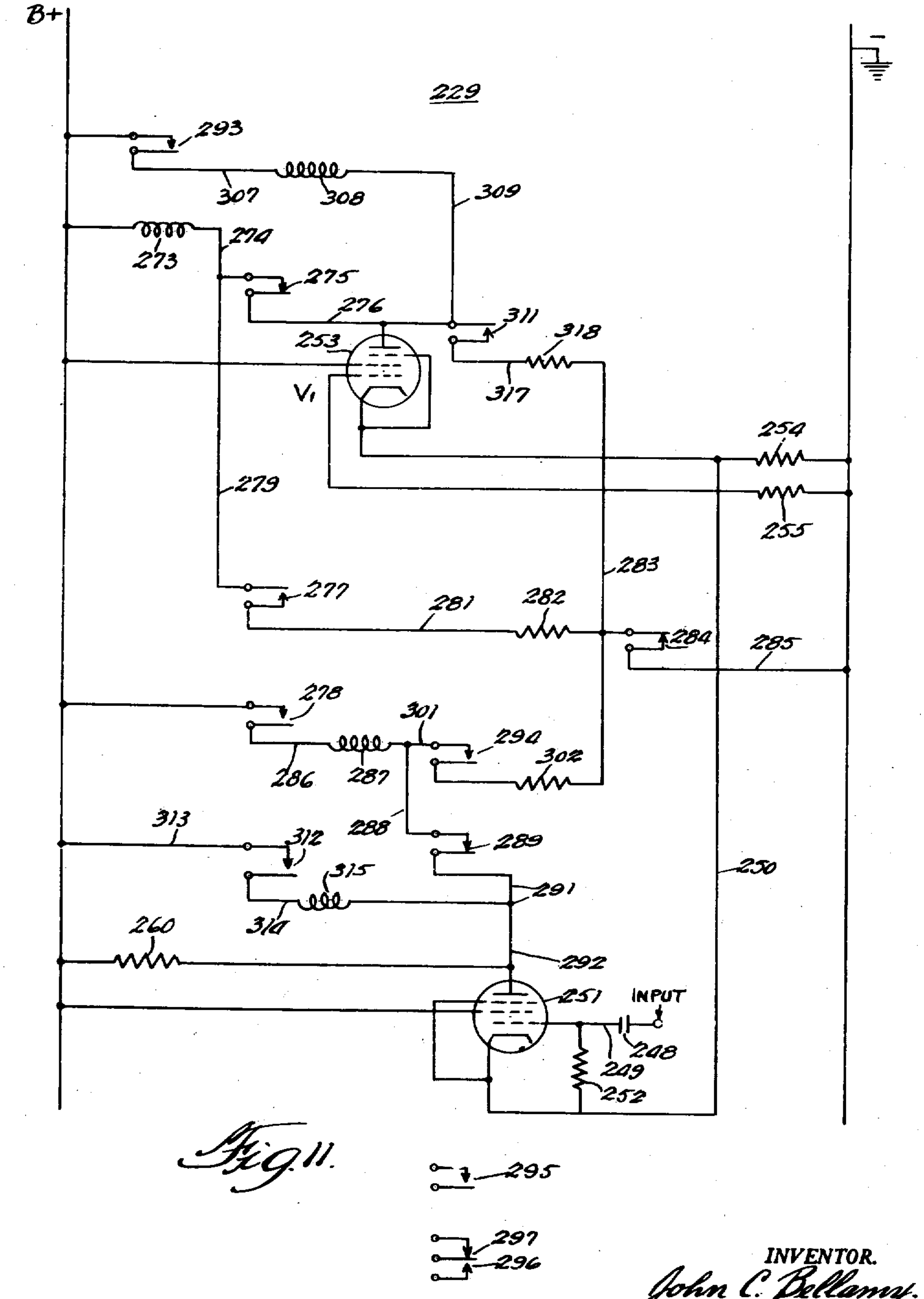
Figures 12, 13:
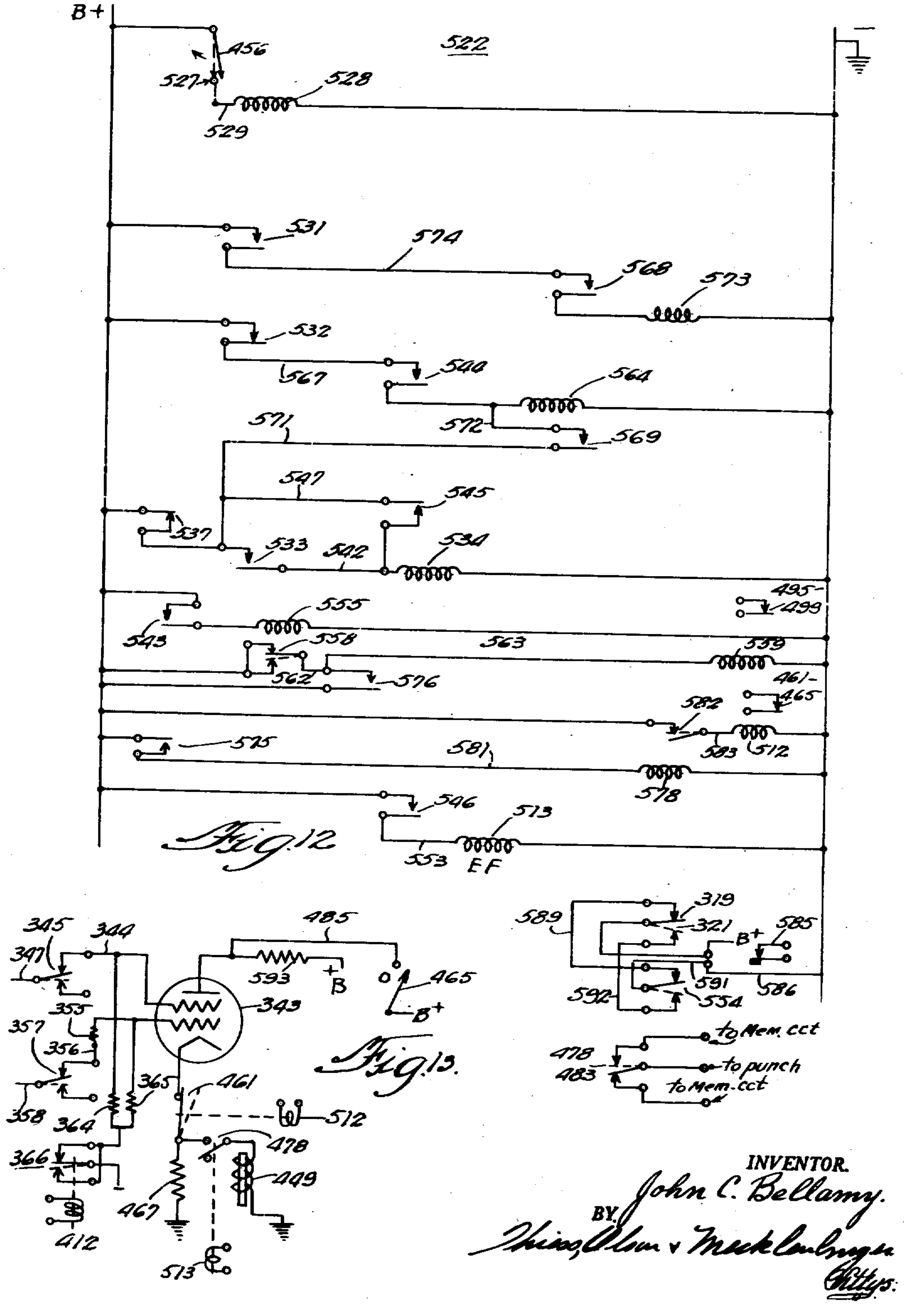

Figs. 10*a*, 10*b*, and 10*c* taken together comprise a circuit diagram of the components illustrated in block form in Fig. 9;

Fig. 11 is a simplified diagram of a component whose complete circuit diagram is shown in Fig. 10*a*;

Fig. 12 is a simplified circuit diagram of a component whose complete circuit diagram is shown in Fig. 10*c*, and Fig. 13 is a circuit diagram on a larger scale of a circuit component shown in Figs. 10*b* and 10*c*.

The structure of the invention and the methods involved therein, for purposes of description, are conveniently separable into two parts, the recording part and the reproducing or transcribing part. Accordingly, the structure embodying the invention will be described in these two major parts, and the figures of the drawings are arranged with this in view. While the structure of the invention is dividable into the recording and reproducing parts, both parts enter into the complete invention of apparatus and method whereby large amounts of data, such for example as instrument outputs, may be recorded in a convenient and accurate form at one point and reproduced into readily readable form with a minimum of manual effort at that same point or at a different point as may be desired.

Figure 1:
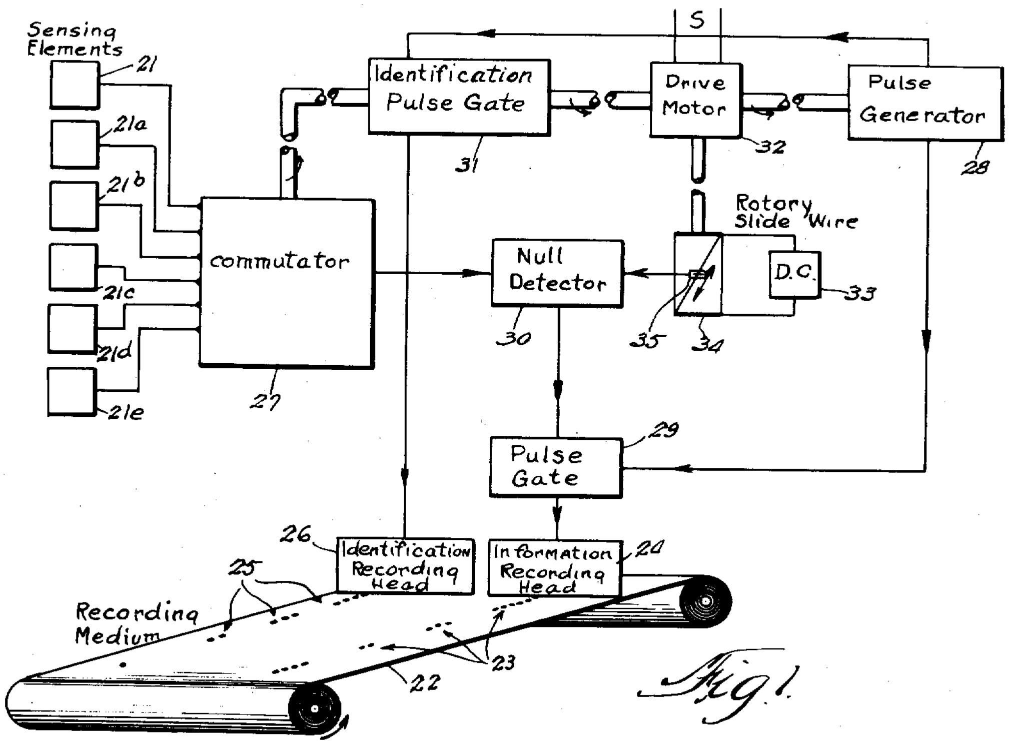
Figure 1 is a block diagram of structure embodying the recording apparatus of the invention and for carrying out the method thereof.

In Fig. 1 there is shown in block diagram form apparatus whereby data or information, as sensed by a series of sensing elements 21, **21*a*, 21*b*, 21*c*, 21*d*, and 21*e*, is recorded on a continuously moving magnetic medium or tape 22, the recording being in the form of distinct or countable magnetic effects or pulses 23, recorded on tape 22 by means of recording head 24**.

The outputs of the sensing elements may, for example, be voltages produced by thermocouple devices detecting changes in temperature, which voltages are converted into or become represented by such separate or countable effects recorded on the medium. The value of the particular instrument output is represented by a number of separate effects which are recorded in one group. For example, a one millivolt instrument output may be represented by 10 effects or pulses, and a five millivolt instrument output may be represented by 50 pulses. Other values of the instrument outputs may be represented by following the same proportion.

To reproduce such data after its recording on the medium, it is necessary to sense and count the number of separate pulses recorded in each group and to produce on a further medium the number of such recorded pulses whereupon it is only necessary to apply the appropriate factor to obtain the instrument reading. This provides a convenient and accurate method of recording and reproducing since a large number of groups of pulses may be accurately recorded on a relatively short length of medium and the pulses of each group may be accurately counted. It is essential only that the effects used be sufficiently distinguishable one from the other so that they may be counted. Accordingly, while in the present invention the effects are magnetic pulses of a single polarity, they may be magnetic pulses of positive and negative polarity, such for example as sine waves, they may be perforations and indentations or merely marks on a tape, they may be spots of light on a film, or any other effect capable of separate detection. For purposes of this application, the effects enumerated, which enumeration is intended to be exemplary and not limiting, may be generically described as discrete effects.

Figure 2:
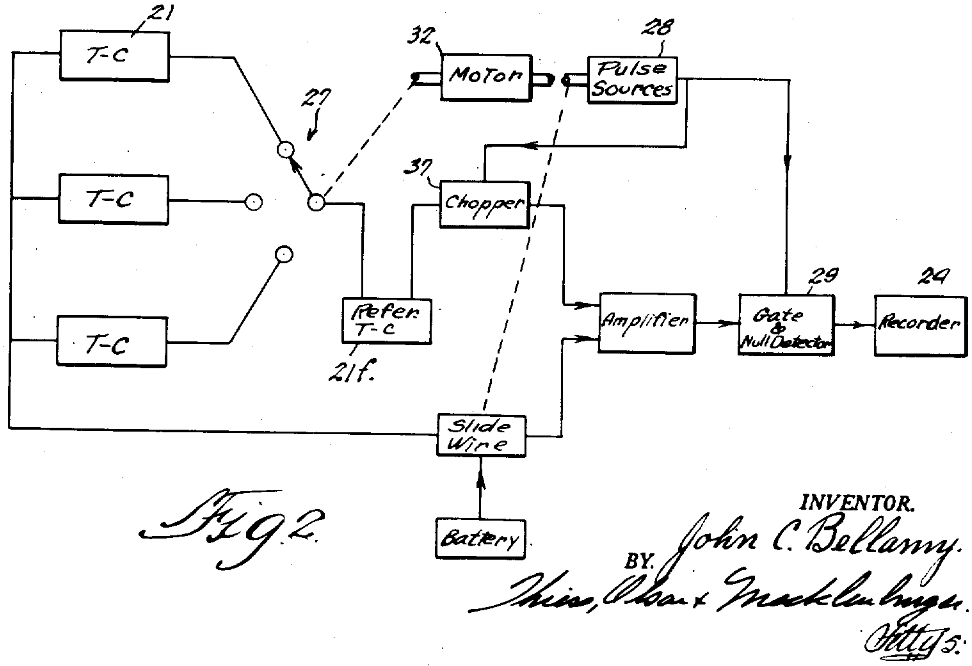
Fig. 2 is another block diagram of structure embodying the recording apparatus of the invention and for carrying out the method thereof.
Figures 3, 5, 6, 7, 8:
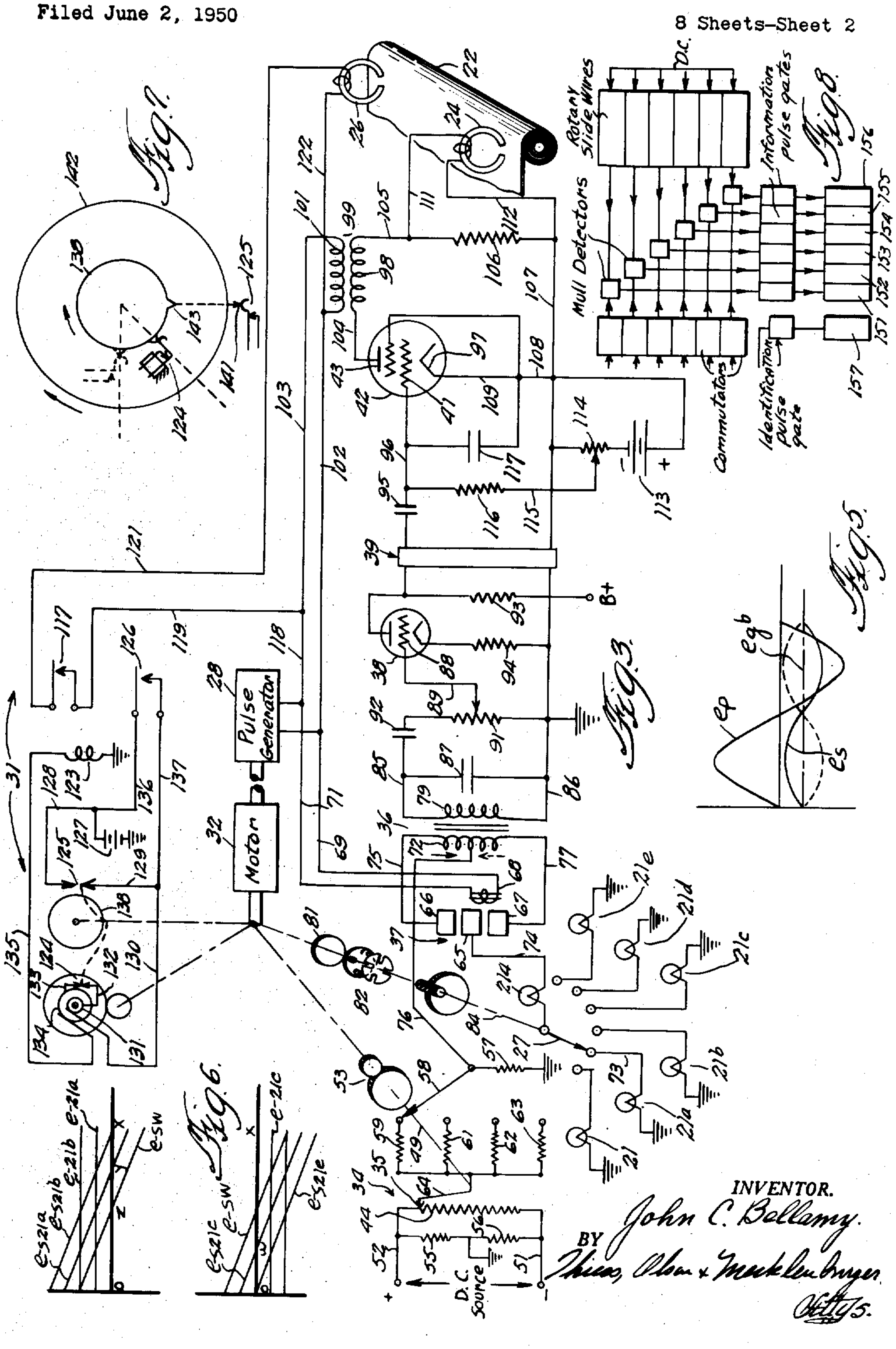
Fig. 3 is a schematic representation in greater detail and a circuit diagram of the apparatus shown in Fig. 1.
Fig. 5 is a series of graphs for explaining the operation of one portion of the apparatus shown in Fig. 3.
Fig. 6 is a series of graphs for explaining the operation of another portion of the apparatus shown in Fig. 3.
Fig. 7 is a diagrammatic and somewhat distorted representation of a portion of the apparatus illustrated in Figs. 3 and 4 for illustrating the operation thereof.
Fig. 8 is a block diagram of further structure embodying the recording apparatus of the invention and for carrying out the method thereof.

While the sensing elements 21 are illustrated in Figs. 2 and 3 as comprising thermocouples, it will be understood that other types of instruments may be used and, if desired, other characteristics than voltage may be utilized as the output, for example, fluid pressure.

The recording apparatus includes means for recording a second series of discrete effects, for example groups of magnetic pulses 25, in direct association, for example side by side, with the groups of information pulses 23. This second series of magnetic pulses or discrete effects are recorded in the magnetic medium by means of a separate recording head 26. The number of separate or countable pulses in each of the groups 25 defines the identity of the instrument whose output corresponds to the associated series of information pulses.

While a single instrument output may be recorded in the manner indicated, the apparatus of the information has advantageous application in instances where a large number of readings of a single instrument or of a plurality of instruments are to be recorded in sequence at defined intervals of time. That is, the outputs of sensing elements 21, **21*a*, 21*b*, 21*c*, 21*d*, and 21*e* may be recorded one after the other followed by a repetition thereof. Hence the apparatus of the invention provides means such as a commutator 27** for connecting the sensing elements to the recording circuit in a predetermined order.

The magnetic pulses which are recorded may be voltage pulses initially generated by a generator 28 and supplied to the recording heads 24 and 26 through the information pulse gate 29 and the identification pulse gate 31. The pulse gates determine the starting instant of pulse recording and the instant of stopping thereof.

The pulse generator 28 may comprise an alternating current generator of a desired frequency, for example an inductor alternator generating 400 cycles per second at proper speed, driven by a drive motor 32 supplied with power from any desired source S. The pulse generator may also be of the electronic tube type or it may be a source of alternating voltage available from power lines.

To obtain a measure of the instrument outputs, a local source of known and linearly varying D. C. voltage is cyclically compared with the data voltages. That is, a D. C. voltage source 33 is provided and is connected to the ends of a rotary or spiral slide wire 34 which is connected to be driven at a desired speed by motor 32. A brush or the like 35 is engaged by the slide wire as it moves along, whereby there is available at the brush during each revolution of the slide wire a voltage varying from a predetermined positive value to zero and to an equal predetermined negative value, the positive and negative values being equal to at least the highest voltage expected of any of the sensing elements. Other voltage distributions along the slide wire may be utilized, if desired, for example, one varying from zero to a positive maximum. Connected between the commutator and the rotary slide wire there is a null detector 30 which continuously compares the sensing element voltage and the slide wire voltage or notes the sum thereof. When the voltage at the commutator and the slide wire voltage are equal and of the correct polarity, the null detector notes a sum or total of zero and the pulse gate 29 is caused to close thereby interrupting the supply of pulses to recording head 24. Assuming that the pulse gate 29 is actuated at the beginning of each revolution of the slide wire to allow pulses to pass to recording head 24, and closes to interrupt the flow of pulses when the slide wire and commutator voltages are equal to zero during that revolution of the slide wire, the number of pulses recorded will be a function of the sensing element voltage. The null detector and other apparatus may, of course, be set up to note a sum other than zero for initiating gate operation and it may be set up to detect differences rather than sums.

For the number of pulses recorded in a group as representing a value of data to have a determinable meaning, it is necessary that there be a direct relationship between the rate of pulse generation and the rate of rotation of the slide wire. That is, if slide wire 34 rotates one revolution per second and the pulse generator is designed to generate 400 cycles per second, then there must be precisely 400 cycles generated for each revolution of the slide wire. If this were not so, each revolution of the slide wire would represent a different number of pulses and the number of pulses recorded on the tape would not be truly representative of the data value. As shown in Fig. 1, the motor 32 is connected to drive the pulse generator. Thus, since the motor also drives the slide wire, it is evident that the same number of pulses will be generated for each revolution of the slide wire. Consequently the rotational speed of the motor is eliminated as a factor in the recording. In one embodiment of the invention the speed of the motor was 6,000 R. P. M. and a gear reduction of 100 to 1 was used to make the slide wire speed one revolution per second.

One value of data is sensed for each revolution of the slide wire and since the same number of pulses are available for each revolution thereof, the number of pulses recorded is a function of the distance along the slide wire which the brush 35 has made, or, it is a function of the proportion of one revolution which the slide wire has made.

Depending upon the rotational speed of the slide wire and the linear speed of the tape 22, the distance along the tape within which the number of pulses of a particular piece of data is recorded may vary, but the specific number of pulses which are recorded does not. Hence, since the number of pulses may be counted, the value of the data is represented thereby irrespective of whether the pulses are spaced close together or far apart. It is the number thereof that is representative of the data. Consequently, the speed of the tape may vary from a certain value without effecting the value of the data recorded.

When the motor is directly connected to drive the pulse generator and the slide wire, a direct current motor or an alternating current motor of either the synchronous or nonsynchronous type may be used since the relationship between the number of pulses generated during a revolution of the slide wire remains fixed. However, if an electronic oscillator or other separate source of supply of pulses is used, it is necessary that the drive motor be of the synchronous type and be synchronized with the pulse generator in order that the number of pulses generated during any revolution of the slide wire is always the same. It has been found for very accurate recording that the direct connection, as shown in Fig. 1, is preferable. Even with a synchronous motor drive there may be times when the motor will be slightly out of synchronism with the pulse generator such as during transient conditions, when the recording will be somewhat inaccurate.

Utilizing a continuous sweep for comparing the voltage of the slide wire and the voltage at the commutator and a null detector for determining when the voltage sum is equal to zero, provides a rapid method for actuating the pulse gate and hence lends itself well to apparatus for rapid recording. Utilization of bridge methods for detecting the equality is slow because of the inherent limitations of such methods and apparatus.

Thus, the improved apparatus and method of the invention encompasses recording of large amounts of data through the combination of digital or discrete effect recording and the slide wire manner of sensing the data value, where the number of effects recorded is determined by the proportion of its cycle which the slide wire has moved and not upon the speed thereof.

The block diagram of Fig. 2 illustrates essentially the same components as Fig. 1, but it illustrates some further elements of the apparatus. Thus, for example, the commutator 27 is shown as a simple moving contact arm engaging various terminals of the thermocouples, the contact arm being driven from the shaft of motor 32. For temperature measurements a reference thermocouple **21*f* is shown and the difference between the thermocouple and slide wire voltages is passed through a chopper for converting the D. C. voltage into an A. C. voltage which is amplified before passing to the null detector and gate 29**.

Figure 4:
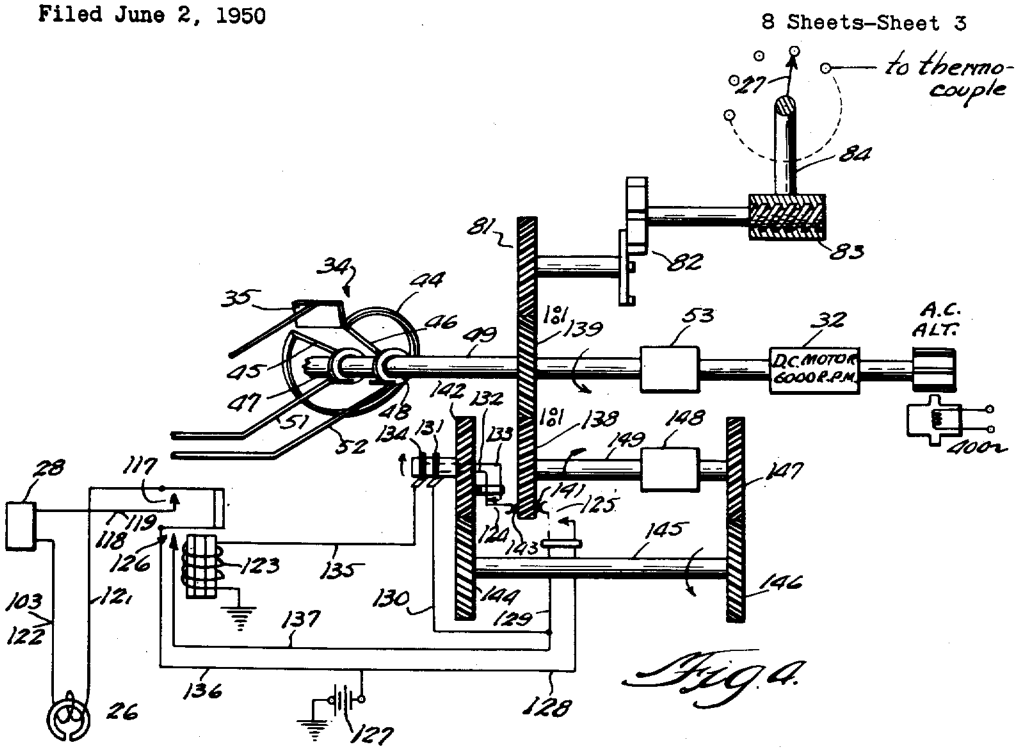
Fig. 4 is a diagrammatic illustration of certain operating components of the apparatus shown in Fig. 3.

In Fig. 3 the apparatus shown in block diagram in Figs. 1 and 2 is shown more completely in circuit diagram form, and in Fig. 4 the system of gears and drive mechanisms for various of the elements shown in block and schematic form in Figs. 1, 2 and 3 are shown more completely. Considering Figs. 1–4 together, and particularly Figs. 3 and 4, the complete operation and the structure of the recording apparatus may be described and understood best, the same reference characters for corresponding parts being used in the various figures.

In Fig. 3 the thermocouple elements 21, **21*a*, 21*b*, 21*c*, 21*d*, and 21*e* are connected, by means of the commutator or rotating arm 27, to be compared with the slide wire voltage, the sum (with due regard for sign) of these voltages being applied to the primary winding of the transformer 36 through a chopper 37. The A. C. voltage appearing across the secondary of transformer 36 is amplified and fed to tube 38 and after proper phase adjustment in phase shifter 39 is applied to the control grid 41 of tube 42. When the voltage on grid 41 is in phase with the voltage applied to the plate 43 of tube 42 and of a value greater than a predetermined bias, the plate voltage being supplied from the pulse generator 28, voltage pulses are supplied to the recording head 24 whereby magnetic effects or pulses are recorded on a moving tape, all as to be more completely described. Pulses from the pulse generator 28 are also supplied through the identification gate mechanism 135 to the identification recording head 26**, also as to be more completely described. While the sum of the slide wire and thermocouple voltages is utilized, it will be understood that apparatus utilizing the difference of these voltages is contemplated by the scope of the invention.

The slide wire mechanism 34 may comprise a wire 44 of suitable resistance characteristics arranged in a one-turn spiral, as seen best in Fig. 4, and having its ends connected to a source of D. C. potential, as shown best in Fig. 3. Referring to Fig. 4, the ends of the spiral wire 44 are shown connected by means of conducting supports 45 and 46 to the slip rings 47 and 48, respectively, insulatingly mounted on the shaft 49. Conductors 51 and 52 are connected by means of brushes riding on the slip rings 47 and 48 whereby the potential of the D. C. source is applied to the ends of the spiral wire. The shaft 49 is driven through gears 53 of suitable ratio, for example 100 to 1, by the motor 32 which may be a direct current type operating at 6,000 R. P. M., for example. Thus, the slide wire 44 will rotate 60 revolutions per minute or one revolution per second. The output voltage of the slide wire is obtained by means of the brush 35 or other suitable contact (head of arrow 35 in Fig. 3) engaging the slide wire 44 and of such width that contact is maintained with the slide wire throughout its full revolution.

In order to establish an appropriate ground for the recording system and to enable the apparatus to sense both negative and positive data voltages, a pair of resistors 55 and 56 are connected across the slide wire 44 and their juncture is grounded. Consequently, as the slide wire rotates, the potential detected by brush 35 varies from a plus value through zero to an equal negative value after which it begins with a plus value again. In order to eliminate the effects of contact resistance, the potential of the D. C. source may be relatively high, for example 200 volts total, whereby the potential along the slide wire will vary from plus 100 volts to ground or zero, and to a negative 100 volts. In comparison to this voltage, the voltage drop due to the contact resistance between brush 35 and the slide wire is negligible.

The part of the slide wire voltage which, ultimately, is compared with the thermocouple voltages is obtained across a small resistor 57 connected by means of a selectable position switch 58 to any one of the resistors 59, 61, 62 or 63 which have different and much higher resistance values than resistor 57. The potential of the spiral wire 44 is transmitted to the resistors 59, 61, 62 and 63 from brush 35 by means of a conductor 64. Schematically in Fig. 3 the dot-dash line connecting the motor shaft through gears 53 to the slide wire represents the connecting shaft 49 of Fig. 4. The resistor 57 and the one of resistors 59, 61, 62 and 63 to which it is connected constitute a potentiometer for developing the desired voltage across resistor 57. Depending upon the range of voltage through which the thermocouples or other sensing instruments are intended to operate, the one of the resistors 59, 61, 62, and 63 will be selected whereby, with the D. C. potential used, a voltage will be developed across resistor 57 which is equal substantially to the maximum or full scale output of the thermocouples or sensing elements. In one particular construction embodying the invention where thermocouple sensing elements were used, the resistor 57 had a value of 2 ohms, the resistors 59, 61, 62 and 63 had values, respectively, of 4,000 ohms, 8,000 ohms, 16,000 ohms, and 80,000 ohms, the resistance of slide wire 44 was 10,000 ohms, and the resistance of resistors 55 and 56 was 4,700 ohms each. Other values of resistance may, of course, be selected, as is well understood in the art, to meet particular conditions.

Since temperatures may vary above and below a predetermined value, the thermocouple elements 21, **21*a*, 21*b*, 21*c*, 21*d*, and 21*e* are connected in respective instances to include a reference thermocouple element 21*f*, the connection being made in each instance by means of the moving contact or commutator 27**.

To obtain an A. C. voltage corresponding to the combined voltages, that appearing across resistor 57 and that of any one of the thermocouples, which may be simply and easily amplified, and which lends itself readily to the control of tube 42, the chopper 37 is used.

The chopper comprises a series of three contacts, the center one 65 of which is driveen between the outer ones 66 and 67 by means of a coil 68 energized from the pulse generator 28 through conductors 69 and 71. These pulses drive the center contact 65 back and forth at the pulse frequency and thus supply the combined D. C. voltage to one side or the other of the primary coil 72 of the transformer 36 through a circuit which may be traced as follows when considering thermocouple **21*a*: From ground through thermocouple element 21*a*, conductor 73, contact arm 27, reference thermocouple element 21*f*, conductor 74, center contact 65, upper contact 66, conductor 75, top half of coil 72, conductor 76, and resistor 57 to ground. Due to the voltage applied through the circuit described, a current flows in the top half of coil 72, as shown, in the direction of the solid line arrow. When the movable contact engages the fixed contact 67 immediately after its engagement with contact 66, the circuit previously traced may be traced also except that from movable contact 65 the circuit extends to lower contact 67 through conductor 77 and the lower half of coil 72 in the direction of the dotted arrow. By virtue of a current flowing through the top and bottom halves of the coil 72, an alternating voltage is developed across the secondary coil 79**.

The same circuits as traced out for thermocouple elements **21*a* and 21*f* may be traced for the combination of thermocouple elements 21, 21*b*, 21*c*, 21*d*, and 21*e* whenever the moving contact arm 27** is connected to the appropriate terminals.

Throughout this specification when the expression thermocouple is used, it will be understood that it may mean a single element or a plurality of elements related to produce a usable output voltage.

Since it is intended that the voltage of one thermocouple will be sensed during one revolution of the spiral slide wire 44, it is necessary that the moving contact arm 27 or commutator engage the various contacts during virtually the complete revolution of the slide wire and move from one contact to the other with a very rapid action at the end of each revolution. To accomplish this, a combination of gears 81 and 139, a Geneva movement 82, and a worm gear 83 connected to contact arm 27 by a shaft 84 is used. Other arrangements may of course be used. The gears 81 and 139 provide the necessary speed reduction between the 6,000 R. P. M. of the motor and the contact arm while the Geneva movement provides the step action in moving the contact arm from one terminal to another, as is well understood. The worm gear 83 is so chosen that arm 27 moves by the amount of displacement of the terminals. In one practical embodiment of the invention the speed reduction was 100 to 1, whereby each one of the terminals was engaged for a period of substantially one second by the contact arm 27, i. e. for the duration of one revolution of the slide wire.

Other forms of commutation arrangements may, of course, be used in place of the rotating switch. For example, combinations of relays whose contacts operate according to a binary system, wherein a relatively small number of contacts are connectible in a large number of different operating connections, may be used.

The voltage developed by secondary winding 79 appears at conductors 85 and 86 and is applied to the condenser 87, which in combination with the winding 79 produces a substantially sine wave of voltage, the desired portion of which is applied to the grid 88 of tube 38 through the conductor 89 and a movable tap engaging the resistor 91, the resistor and the condenser 92 being connected across the conductors 85 and 86. The tube 38 amplifies the voltage applied to its grid. The tube 38 is connected in conventional fashion with voltage applied to its plate through a suitable resistor 93 from a source of voltage B+ and its cathode is connected through a suitable resistor 94 to the conductor 86, as shown.

Various types of tubes may be used for tube 38 and different values of plate voltage and plate and cathode resistors may be used to meet particular conditions, as is well understood in this art.

The output voltage of tube 38 is applied to the phase shifting network 39 from which an output voltage properly adjusted in phase is applied through condenser 95 of suitable value and conductor 96 to the control grid 41. Plate voltage is applied between the cathode 97 of tube 42 and the plate 43 by means of the secondary 98 of a transformer 99, the primary 101 of which is connected to be supplied with voltage from the pulse generator 28 through conductors 102 and 103. The plate-cathode circuit of tube 42 may be traced as follows: From plate 43 through conductor 104, secondary winding 98, conductor 105, resistor 106, and conductors 107, 108 and 109 to cathode 97. The winding of recording head 24 is connected by means of conductors 111 and 112 to conductors 105 and 107, respectively, that is, directly across resistor 106. Hence, the voltage developed across resistor 106 is applied to the recording head and effects recording on the moving tape. The resistor 106 may be selected to provide the character of operation desired.

The tube 42 may be of of the type designated as 2D21, a gas filled tube, in which after the current begins to flow, the control grid is no longer effective, and current continues to flow until the plate voltage is reduced to zero or the circuit is interrupted.

A suitable bias may be applied to the control grid 41 so that even though voltage is applied to the plate from pulse generator 28 through transformer 99 and the circuit described, no current will flow in the plate circuit and thus no pulses will be supplied to recording head 24 unless the signal or data voltage applied to control grid 41 is in phase with the plate voltage and is greater than zero. The bias voltage is obtained from a battery 113 with a resistor 114 connected across it as shown, one end of the resistor being connected to the conductor 107 and thus to cathode 97. Resistor 114 is provided with a variable tap, and by means of a conductor 115 and a resistor 116 a desired percentage of the voltage developed across resistor 114 is applied to control grid 41 through conductor 96. A condenser 117 is connected across grid 41 and cathode 97 to provide a by-pass to ground for undesired transient voltages in order that it may not trigger the tube 42 at undesired times.

The operation of tube 42 may best be understood by referring to Fig. 5 in which the voltage applied between the plate and cathode of the tube is shown as the sine wave $e_p$, the bias on grid 41 is shown as the dot-dash line $e_{gb}$, and the signal or data voltage derived through the circuit described from the slide wire and thermocouple voltages is shown as the sine wave $e_s$. When the amplitude of $e_s$ is zero, that is, there is no signal voltage, the grid bias $e_g$ prevents the flow of current in the plate circuit of the tube irrespective of the value of the plate voltage. When, however, the signal voltage is greater than zero and is in phase, current will flow in the plate circuit of the tube during the positive half waves of the plate voltage. When the plate voltage goes through zero, the flow of plate current stops and does not begin again until the plate voltage again becomes positive. If the signal voltage is negative, as shown by the dotted sine wave, there will be no flow of current in the plate circuit during either half wave of the plate voltage.

The operation of the recording of data or information pulses may now be understood in connection with the following summary.

It is assumed that a suitable magnetic tape 22 is moving past the recording head 24 at any suitable or desired speed. Likewise, the motor 32 is operating at its normal speed of 6,000 R. P. M. and thus the pulse generator 28 is supplying pulses at the rate of 400 per second. The motor and the pulse generator are coupled so that the rate of pulse generation is a direct function of the motor speed. Hence, as already pointed out, during one revolution of the motor, a fixed number of pulses are generated irrespective of the motor speed. Also, due to the direct drive of the slide wire 44 by the motor and due to the direct drive of the rotating arm 27 by the motor, the slide wire 44 revolves once for each 60 revolutions of the motor or once a second if the motor speed is precisely correct and the contact arm 27 shifts from one contact or terminal to the next after the slide wire has completed one revolution. The slide wire 44 and the contact arm 27 are so related that the beginning end of the slide wire engages the brush 35 and thus supplies a positive maximum voltage at the instant the contact arm engages a particular thermocouple terminal, for example, the one connected to conductor 73.

It is assumed that the voltage of the thermocouple elements 21_a_ and 21_f_ is positive. This is added to the positive voltage developed across resistor 57 for application to the primary winding 72. The moving contact 65 moves in synchronism with the voltage of generator 28 and thus a voltage having the same frequency as that of the pulse generator is produced. Since the thermocouple voltage and the voltage across resistor 57, sometimes referred to as the slide wire voltage, is positive, a positive signal voltage, $e_s$, relative to the grid bias, $e_g$, is applied to control grid 41 and thus a pulse is recorded at recording head 24 for each positive half wave of the plate voltage $e_p$.

It is assumed that for the short interval of one second the thermocouple voltage is constant and is equal to one-half of the maximum positive of the slide wire voltage. Hence, for the condition of operation being described, it may be represented by the horizontal line labeled _e_—21_a_ (Fig. 6). The line labeled _e—sw_ represents the voltage of the slide wire during any revolution thereof. As shown by the line _e—sw_, this voltage varies from a plus maximum value at the origin, O, to a negative maximum value at X with a zero value half way between, i. e. at point Z. Hence, the distance from the origin to the point X represents one revolution of the slide wire. Since the voltage of the slide wire and the positive voltage of the thermocouple are added together, the resultant voltage may be represented by a line labeled _e—s_21_a_ which corresponds to the data or signal voltage at grid 41. It will be noted that this voltage decreases as the slide wire rotates and reaches zero three-quarters of the distance from the origin to point X, i. e. at point Y. That is to say, after three-quarters of a revolution of the slide wire the signal voltage appearing at the grid 41 is zero relative to the grid bias and thus for the remaining portion of the slide wire cycle the recording of pulses will cease. Referring to the graph _e—s_21_a_ and Fig. 5, recording of pulses occurs until the combined slide wire and thermocouple voltage is equal to zero, i. e. during that part of the slide wire cycle from the cycle beginning or origin, O, to the point Y. From Y to X, the end of the slide wire cycle, no recording of pulses occurs.

Since the A. C. voltage produced by the chopper 37, the transformer 36, and the other circuit components present may vary in phase somewhat depending upon the constants of these components, the phase shifting network 39 has been provided in order to be certain that the signal voltage at the grid 41 is in phase with the plate voltage, or perhaps equal to some other value.

Under the condition described where the combined slide wire and thermocouple voltage reached zero after three-quarters of a revolution of the slide wire, 300 pulses were recorded on tape 22 inasmuch as 400 pulses are available for the full revolution of the slide wire. The 300 pulses recorded, consequently, correspond to a data value of half scale positive which may have any actual value, for example one-tenth volt.

After pulse recording has stopped, the slide wire continues its rotation, however, and at the instant it reaches the end of its travel and begins another cycle, the switch arm 27 moves from the terminal of thermocouple element 21_a_ to the next adjacent terminal (thermocouple element 21_b_) with a quick action due to the Geneva movement. It is assumed that the thermocouple 21_b_ is sensing a full scale voltage of plus two-tenths volts. This would be represented by the horizontal line labeled _e_—21_b_ (Fig. 6). The voltage represented by this line is, of course, combined with the slide wire voltage _e—sw_ and the combination is represented by the line _e—s_21_b_. The combined values of voltage, as shown by the line _e—s_21_b_, has a high initial value and thus at the instant of starting a slide wire cycle the recording of pulses begins and continues at the regular rate until the voltage _e—s_21_b_ reaches zero at the point X, that is, after a full revolution of the slide wire. During this full revolution of the slide wire, 400 pulses were recorded according to the method already described. Hence, 400 pulses correspond to a full scale measurement or two-tenths volt. Similarly, at the end of this cycle of the slide wire, the contact arm 27 shifts to the next thermocouple terminal (21_c_). Assuming that this thermocouple reading is zero, the combined voltage supplied to the transformer is represented by the line _e—sw_, and since this is a positive value at the beginning of the slide wire cycle, the recording of pulses begins. The recording continues until the slide wire voltage reaches zero, as shown by the point Z after one-half of a revolution of the slide wire. During this one-half revolution, 200 pulses have been recorded, and consequently 200 pulses correspond to a zero data voltage.

This process continues and in Fig. 6 there is shown the resulting voltage combinations when the voltages of the thermocouples are negative. Assuming that the thermocouple 21c has a negative half scale value, that is, a negative one-tenth volt, this voltage may be represented by the line *e*—21*c*. The combination of this voltage with the slide wire voltage *e*—*sw* is represented by the line *e*—*s*21*c*. The combined voltage, initially, is positive and recording of pulses begins at the beginning of the slide wire cycle. After one-quarter of a revolution thereof, i. e. at point *w*, the voltage *e*—*s*21*c* reaches zero and the recording of pulses stops. One hundred pulses have been recorded and this corresponds to a negative data voltage of one-tenth volt. Correspondingly, if the thermocouple 21e has a negative full scale value or negative two-tenths volt, the combined voltage is represented by the line *e*—*s*21*e* which is zero at the origin and is negative throughout the slide wire cycle. Hence, no pulses are recorded and zero pulses correspond to a maximum negative voltage or negative two-tenths volt.

It will be noted that for positive data or thermocouple voltages more than two hundred pulses are recorded, and for negative data voltages less than two hundred pulses are recorded.

The tube 42 acts in certain of its aspects as a combined null detector and gate since it is responsive when the combined data and slide wire voltage is zero or negative to prevent recording, and is responsive when the combined voltage is greater than zero in the positive direction to permit recording of pulses.

A record of the character made by the appratus described, i. e. a series of magnetic pulses on the tape, the number of which corresponds to the value of the instrument output, is in and of itself not identifiable as belonging to a particular instrument except insofar as the order of the group of pulses on the tape does so. Should the knowledge of the instrument with which a tape was started and the order in which the instruments were sensed be lost, the accumulated data would be meaningless. However, as pointed out hereinbefore, a series of pulses are recorded in direct association with the data or information pulses in order to identify them at all times. This is accomplished by providing the recording head 26 in side-by-side relationship with the recording head 24 and supplying pulses thereto from the pulse generator 28 at the beginning of each slide wire cycle and terminating them after an interval of time or portion of a slide wire cycle which corresponds to the particular instrument being sensed. This timing function is performed by the apparatus 31, previously designated as the identification pulse gate.

The identification pulse gate comprises, broadly, a pair of quick acting micro-switches which close to effect the beginning of pulse recording at the beginning of each slide wire cycle and which open after a predetermined interval determined as a function of the position of the rotating contact member 27 to stop the pulse recording.

The structure and operation of the identification pulse gate may best be understood by considering Figs. 3, 4 and 7. A pair of normally open contacts 117 are arranged between pulse generator 28 and identification recording head 26. When contacts 117 are closed, pulses are supplied to the recording head, and when contacts 117 are open, pulses are not supplied, the circuit therefor being traced as follows: From pulse generator 28 through conductors 118 and 119, contacts 117, conductor 121, the coil of recording head 26, and conductors 122 and 102 to the pulse generator. The contacts 117 are spring biased to normally open position and are closed only when coil 123 is energized. When coil 123 is de-energized, the contacts 117 open.

Energization and de-energization of coil 23 is effected by means of the micro-switches 124 and 125 operated by gears from the motor 32, and contacts 126 operated by coil 123 to form a holding circuit therefor. Switch 124 is normally closed and switch 125 is normally open. Hence, the energization circuit for coil 123 may be traced as follows: From ground through a battery 127, conductor 128, switch 125 when closed, conductors 129 and 130, slip ring 131, conductor 132, normally closed switch 124, conductor 133, slip ring 134, conductor 135, and coil 123 to ground. Current flows through coil 123 thereby causing contacts 117 and 126 to close. The closed contacts 126 form a holding circuit for coil 123 which may be traced as follows: From ground through battery 127, conductor 136, closed contacts 126, conductors 137 and 130, slip ring 131, conductor 132, normally closed switch 124, conductor 133, slip ring 134, conductor 135, and coil 123 to ground. Hence, even though the contacts 125, whose closing effected the initial circuit for energizing coil 123, are subsequently opened, coil 123 is not de-energized due to the holding circuit being completed through contacts 126. At the instant of closing contacts 117, pulses are, of course, supplied to head 26 and recording thereof takes place upon tape 22. Coil 123 is de-energized by the momentary opening of switch 124 in a manner to be described. De-energization of coil 123 causes contacts 117 and 126 to open thereby discontinuing the supply of pulses of head 26 and also interrupting the holding circuit for coil 123. Accordingly, coil 123 is not energized until switch 125 is again closed.

The switch 125 is mounted relatively closely to a gear 138 driven from a gear 139 mounted on shaft 49 connected to motor 32. A projection or lug 141 is attached to gear 138 so that once during each revolution of this gear switch 125 is closed and opened, that is, it is closed only momentarily. The switch 124 is mounted on a gear 142 so as to rotate therewith. The conductors 132 and 133 and slip rings 131 and 134 are also mounted on gear 142 and its shaft so as to complete the circuit to switch 124, as already traced out. The gears 142 and 138 are made to rotate in the same direction by virtue of the gears between them. A projection or lug 143 is attached to gear 138 and is so mounted that during each revolution of this gear the switch 124 is engaged and is caused to open and close its contacts, that is, the switch is opened only momentarily. Referring to Fig. 4, gear 142 is driven from a gear 144 mounted on a shaft 145 in turn driven by a gear 146 meshing with a gear 147 which is driven through gears 148 and a shaft 149 connected to gear 138. The gear ratios between the pairs of gears 146, 147 and 142, 144 may be 1 to 1, respectively, and thus the number of revolutions made by gear 138 relative to gear 142 is determined by the gear ratio of the gears 148. In one actual construction the ratio of gears 148 was 100 to 1 so that for each revolution of gear 138, gear 142 made one hundredth of a revolution. Gears 138 and 142 may be mounted in any suitable manner and, for example, may be arranged coaxially.

Referring more particularly to Fig. 7, the relative arrangement of the switches 124 and 125 and the gears 138 and 142 may be noted. In this figure, the gears 138 and 142 are arranged as though an observer were looking along the axis of these gears in a direction from right to left, as viewed in Fig. 4. Gear 142 is shown exaggerated in size in order to bring out the operating relationship between the switches and the operating lugs. As may be visualized in Fig. 7, the switch 125 is stationarily mounted and is adapted to be actuated by a lug 141. Switch 124 is mounted on gear 142 angularly displaced relative to switch 125, it being assumed that the condition described is the one at the beginning of operations.

The angular displacement between switches 124 and 125 is equal to the angular distance which gear 142 makes during a complete revolution of the gear 138. Hence, the angular displacement between switches 124 and 125 is that traversed by gear 142 while arm 27 remains in contact with the terminal of any thermocouple.

Assuming that the apparatus is operating, it is noted that switch 124 is closed and that switch 125 is closed and is about to open by virtue of the fact that lug 141 is about to move toward the left and hence off of the operating tab of switch 125. Since switch 125 is closed, coil 123 is energized through the previously described circuit and consequently pulses are supplied to the recording head 26. The adjustment of the various components is such that the slide wire 44 is just beginning its travel along the brush 35 at this point and the recording of data pulses is taking place at head 24. As soon as lug 141 moves off of the operating tab of switch 125, this switch opens up, the holding circuit for coil 123 keeps this coil energized, and consequently keeps data pulses flowing to head 24. Gear 138 rotates and after rotation of one-hundredth of a revolution (exaggerated in Fig. 7 for clarity) lug 143 engages the operating tab of switch 124, momentarily opens it, and thus stops the recording of identification pulses by head 26 in a manner as already described. Consequently, on the tape 22 there have been recorded a number of pulses corresponding to one-hundredth of a revolution of gear 138, which number of pulses corresponds to the identity of thermocouple 21*a*. The recording of identification pulses now ceases, but gear 138 continues to rotate until it reaches the initial position at which point lug 141 closes switch 125 again. At this point the contact arm 27 shifts to engage the terminal of thermocouple 21*b*. At the same time, the slide wire 44 again engages brush 35 at the beginning of its cycle and a series of data pulses is recorded by head 24 for thermocouple 21*b*. Correspondingly, due to the closure of switch 125, identification pulses are being supplied to recording head 26. During the first complete revolution of gear 138, the switch 124 moved from the position shown solid to the position shown dotted. Hence, for thermocouple element 21*b* the gear 138 must move an angular distance from its initial position of twice the amount which it moved for thermocouple element 21*a* before the lug 143 opens the switch 124 to stop recording of identification pulses. Hence, for thermocouple element 21*b*, twice as many identification pulses are recorded as for thermocouple element 21*a*. Accordingly, thermocouple 21*b* is adequately identified. Similar operation occurs for the other thermocouple elements. That is to say, for each thermocouple element whose output is being recorded, the gear 138 has to rotate a correspondingly greater distance before the switch 124 is opened to discontinue recording of identification pulses.

While the identification pulse gate has been shown and described as a series of mechanical switches operated in timed sequence with the commutator, it will be understood that other forms of gate means may be used, such for example as a gas type tube whose control grid and plate voltages are controlled in a suitable fashion.

Thus far, only a single channel recording apparatus has been described, that is, apparatus having only a single information recording head and a single identification recording head have been dealt with. The invention may be embodied in multiple channel apparatus and in Fig. 8 there is shown in block diagram form a portion of such apparatus. Certain components, which are identical to those of Figs. 1–7, are not shown in Fig. 8 but the plural elements associated with a plurality of information recording heads and one identification recording head are shown. Thus, there are shown a series of information recording heads 151, 152, 153, 154, 155 and 156 which may be arranged side by side so as to record in different channels on the same tape. Placed alongside the information recording heads is a single identification recording head 157. It is assumed in this example that each of the information recording heads records at the same time but in its own longitudinal channel so that one identification head may be used to identify all of the information pulses across the tape at that point. If the various information heads are set up to record at different intervals, a separate recording head may be arranged for each identification head. Each recording head is connected through its own pulse gate, each pulse gate is caused to become effective through its own null detector, and each null detector is connected between a commutator and a rotary slide wire for the particular channel, each slide wire being energized from a D. C. source.

In the simplest form of recording according to the apparatus of Fig. 3, there results a tape having two channels or lanes of pulses or magnetic effects recorded thereon. Both rows of pulses consist of groups of pulses or magnetic effects which begin at the same transverse line on the tape and end at points depending upon the identity of the particular instrument and the value of the data indicated by that instrument.

To take a tape containing the magnetic pulses or other effects recorded thereon and produce a readable or readily understandable record, it is necessary to count the various pulses in each group of each channel and to record a number or some other form of effect which embodies the identity and the data. Thus, for example, in Figs. 9–11 there is described apparatus for counting the pulses on the tape and for causing a punch device to punch holes opposite a number in each row of numbers on a card so that the holes opposite particular numbers indicate the number of magnetic pulses and hence the data represented thereby. Likewise, the punches opposite the numbers in certain other rows would indicate the number of pulses in the identification grouping.

A punch of the character referred to may be a completely automatic machine to which appropriate signals are supplied, such machines being available, for example, as those manufactured by the International Business Machines Corporation.

In Fig. 9, there is shown a block diagram illustrating apparatus for carrying out the reproducing or transcribing function and embodies a pickup 171 at one end and a punch 172 at the other with appropriate relays and other apparatus connected between.

The simplest tape record comprises an information channel and an identification channel spaced side-by-side, the reproducing or transcribing apparatus for which includes substantially duplicate sensing, counting and other apparatus.

Since the data on the tape and the identity thereof exist in the form of discrete effects or pulses, it is necessary to count these pulses after they have been detected and to obtain a signal of some character corresponding to the number of pulses counted. The punch making the final readable identity and data record, it being contemplated in one form of the invention that a separate card will be punched for each sample of data, takes a finite length of time to punch each card. Consequently, it is necessary that some form of memory apparatus be provided to hold or remember the number of pulses corresponding to one set of data and its identity while the immediately succeeding one is being counted. According to one form of the invention, two memory circuits are provided for the information channel and two memory circuits for the identification channel with a single counter on each channel, and switching apparatus is provided for switching the counters from one memory circuit to the other and for switching the punch from one memory circuit to the other.

The reproducing or transcribing apparatus and method may best be understood by a detailed reference to Figs. 10*a*, 10*b* and 10*c* in combination with Fig. 9.

The pickup 171 may comprise a series of pickup heads 173, 174, 175 and 176, one each corresponding to each information channel and a pickup head 177 corresponding to the identification channel. Each of the information pickup heads is connected to a terminal, as shown, and consequently may be connected by means of a channel selector switch 178 to the following apparatus. In other words, the apparatus as disclosed determines the information and identification of one information channel at a time. Sufficient repeat operations of running the tape through the pickup are carried out to obtain the information in all channels. The tape 22, shown in Fig. 10*a*, may of course be the same tape as is shown in Figs. 1 and 3.

The apparatus in the information side as well as in the identification side of the reproducer may, perhaps, be best considered together. In Fig. 10*a*, selector switch 178 is shown connected to pickup head 174 which operates in channel No. 2. Hence, it will be assumed that channel No. 2 is the same channel which was recorded by the recording head 24. The pickup head 177 is shown connected to the apparatus at all times since the simpler form of the apparatus is being described wherein only one identification pickup head is needed.

The magnetic (discrete) effects existing in the appropriate channel of the tape when moving past head 174 induce a voltage into the coil thereof which voltage is supplied by means of conductors 179 and 181 to the information counter 180 including three stages or decades 182, 183 and 184. Likewise, the identification pulses moving past head 177 induce a voltage into the coil thereof which is supplied by means of conductors 207 and 208 to an identification pulse counter 209 including two decades or stages 226 and 227 preceded by a scale unit 230.

The counter stages or decades 182, 183 and 184 combined will count from zero to 999 pulses while in the particular apparatus described only 400 pulses are needed. Likewise, the decades or stages 226 and 227 between them will count from zero to 99 pulses while 400 pulses are available, but since only 100 or less sensing elements are being used in the particular form of recording apparatus, 100 or less pulses are all that are needed. Hence, the counter 209 is preceded by the scale unit 230 which produces an output impulse for every four input impulses supplied to it.

The counter stages are of a well known type and it is not believed necessary to describe them in detail. However, each stage may comprise a series of tubes so connected in a ring circuit and in a binary unit that when pulses are received certain tubes become conducting in sequence and certain other tubes become nonconducting in sequence. Hence, by observing the particular pair of tubes which are conducting, one may know how many pulses have been received. Counters of this character are generally available and may be of the type used in association with Geiger-Mueller tubes for radio activity measurement.

The stage 182 consists of a series of tubes connected in a ring 160 of five units or groups of tubes and a binary 185 consisting of two units or groups of tubes. It may be assumed that the tubes in the ring 184 fire or become conducting in a sequence around the ring, as indicated by the numbers written adjacent each tube combination. That is, when the apparatus is first energized and zero impulses have been received, the first tube is conducting. When one pulse is received the second tube in the ring conducts, when the second pulse is received the third tube in the ring conducts, and when the third tube is received the fourth tube in the ring conducts. Similarly, the fifth pulse causes the first tube to conduct again and the sixth pulse causes the second tube to conduct again. At the same time, for zero, one, two, three and four pulses, respectively, one of the tubes of the binary combination conducts and for five, six, seven, eight and nine pulses, respectively, the second tube of the binary conducts. Hence, after any number of pulses between zero and nine, there are always two tubes in the first counter stage which are conducting or are producing a signal. The particular combination of two tubes indicates a number from zero to nine.

During the first nine pulses, the other two decades of the counter are not active, but when nine pulses have been received by the first decade 182 a signal is transmitted to the second decade 183 which functions in a manner similar to the first, the second decade, however, receiving one signal for every ten signals received by the first decade whereby the combination of the first and second decades will count from zero up to 99 pulses. After 99 pulses have been received, the second decade transmits a signal to the third decade 184 which receives a signal only for every 100 pulses, and thus between the three decades, pulses from zero to 999 may be counted. After a series of pulses corresponding to one instrument output have been received, the particular ones of the tubes in the three decades which remain conducting or which are putting out signals indicate the number of pulses which have been received and these signals are transmitted to one or the other of the memory circuits for conditioning them.

The decades 226 and 227 of the identification counter operate in a manner similar to the decades 182 and 183 of the information counter. Hence, opposite the tube combinations of the ring circuit and the binary of decade 226 numbers have been written indicating the number of pulses which, after receipt, activate the particular tubes. Inasmuch as the decade 226 is preceded by a scale of four counters 230, the decade 226 receives a pulse for every four pulses received by scale 230; hence, the decades 226 and 227 together count only from zero to 99. After a series of pulses corresponding to the identification of a particular instrument have been received, the particular tubes of the two decades which remain conducting or which are putting out signals indicate the number of pulses which have been received and these signals are transmitted to one or the other of the memory circuits for conditioning them.

Energization or voltage supply is connected to the tubes of the counters 180 and 209 by means of a conductor 186 connected through a single pole double throw switch 187 (Fig. 10*b*) to a source of voltage B+. By momentarily opening the switch 187, voltage is removed from the tubes of the counters thereby clearing the tubes and enabling them to begin a new count. Other combinations of tubes for each decade other than the ring and binary combination shown may of course be used, but it has been found that in connection with the memory apparatus to be described subsequently the combination shown is preferable.

In Figs. 10*b* and 10*c* there are shown two groups of tubes 188 and 189 outlined, respectively, by the dotted line rectangles, each of these combinations comprising a total of 50 tubes of which only certain ones have been shown complete, the remaining ones being represented by small circles. The tubes of group 188 are divided into five horizontal rows 191, 192, 193, 194, and 195, and ten vertical columns 196, 197, 198, 199, 201, 202, 203, 204, 205 and 206.

Correspondingly, the tubes of group 189 comprises a series of five horizontal rows 211, 212, 213, 214 and 215, and ten vertical columns, those in line with vertical columns of group 188 being designated by the same reference characters. The horizontal rows of tubes 193, 194 and 195 of group 188 comprise the #1 information memory circuit 221 and the horizontal rows of tubes 213, 214 and 215 of group 189 comprise the #2 information memory circuit 222 (Fig. 9) for the information counting side of the reproducer. The horizontal rows of tubes 191 and 192 of group 188 comprise the #1 identification memory circuit 223, and the horizontal rows of tubes 211 and 212 of the group 189 comprise the #2 identification memory circuit 220 (Fig. 9) of the identification side of the reproducer.

In order to utilize the rapid rate of card punching which may be realized in the punch 172, the two memory circuits are used, and input and output switching relays 224 and 225 are provided, respectively, for alternately connecting the information counter 180 to memory circuits 221 and 222 (rows of tubes 193, 194, 195 and rows of tubes 213, 214, 215 respectively) and the punch 172 to the memory circuits 222 and 221. Likewise, relays 224*a* and 225*a* are provided, respectively, for alternately connecting the identification counter 209 to memory circuits 223 and 220 (rows of tubes 191, 192 and rows of tubes 211, 212, respectively) and the punch 172 to the memory circuits 220 and 223. In this manner the punch is receiving its signal from one memory circuit (both information and identification) while the information counter is conditioning the other memory circuit and neither piece of apparatus need wait upon the other.

In the apparatus as described, the input switching relays 224 and 224*a* and the output switching relays 225 and 225*a* (Fig. 9) may comprise single relays since the punch and the counters may be switched for the information and identification channels at the same time. Separate relays may be used if desired.

The counters count so long as pulses are being received thereby. Hence, it is necessary to provide apparatus for detecting when the pulses corresponding to a particular instrument output have been counted in order that the counter performing this function may become free to count the pulses corresponding to the succeeding instrument output. This is accomplished in the present apparatus by providing a circuit including an isolation amplifier 228 and input control relays 229 controlled by the amplifier so that the switching relays 224 and 224*a* are actuated whenever neither information nor identification pulses are being received.

It will be recalled that in the recording process, at the end of recording pulses corresponding to one instrument output, the contact arm 27 is switched from one thermocouple to another. During this short interval and earlier, if information and identification pulses have already stopped, a gap exists on the recording tape wherein there exist no pulses, that is, no identification pulses and no information pulses. The isolation amplifier 228 and the input control relays sense this gap and cause the counters to be switched from one memory circuit to the other.

The construction and operation of the isolation amplifier 228 and the input control relays 229 may best be understood by a reference to Figs. 10*a* and 11.

The isolation amplifier comprises particularly an amplifier which may be a double triode tube 231 of the 12AX7 type, or it may be a pair of separate tubes connected together in the equivalent circuit. The pulses from the information channel are supplied to one grid 233 of tube 231 through conductors 179 and 232 and the pulses from the identification channel are supplied through conductors 207 and 234 to the grid 235. The cathodes of the two tubes are connected through equal resistors 236 and 237 to ground and the grids 233 and 235 are connected by means of equal resistors 238 and 239 to ground, as shown. The plates of the two parts of the tube are connected together and through a resistor 241 to a source of D. C. voltage B+. The plates of tube 231 are also connected together and through a conductor 242 and a condenser 243 to the control grid of a tube 244 which may be of the 6AQ5 type.

The values of the various tube constants and voltages may be chosen as is well understood in this art to meet particular operating conditions.

Since the plates of tube 231 are connected together, they form a common circuit and hence an output is produced at conductor 242 whenever pulses are being supplied to either of the grids 233 and 235 or to both of them. No output, however, is obtained when pulses are being supplied to neither grid.

The grid and cathode of tube 244 are connected through resistors 245 and 246 to ground and the plate thereof is connected through a resistor 247 to a source of D. C. voltage B+ to which also is connected to the screen grid. The tube 244 acts largely as an amplifier of the signal produced by tube 231. The plate of tube 244 is connected through a condenser 248 and a conductor 249 to the control grid of a tube 251, which may be of the 6AQ5 type, the control grid being connected to the cathode as shown through a resistor 252. Plate voltage is supplied to tube 251 through a resistor 260, as shown. The cathode of tube 251 is connected by conductor 250 to the cathode of a tube 253, the two connected cathodes being then connected to ground through a resistor 254. The tube 253 may also be of the 6AQ5 type. The control grid of tube 253 is connected through a resistor 255 to ground and the screen grids of tubes 251 and 253 are connected to a source of B+ voltage as shown.

Tubes 251 and 253 are so arranged that when a signal is transmitted along conductor 249 corresponding to the receipt of pulses by tube 231, tube 251 becomes nonconducting and tube 253 becomes conducting. When no signal is transmitted along conductor 249, that is no pulses are received by tube 231, then tube 251 becomes conducting (assuming plate voltage is applied thereto) because the grid of the tube is at cathode potential. The current flowing through tube 251 flows through resistor 254 which is also in the cathode circuit of tube 253. The grid of tube 253 being connected to ground, the voltage developed in resistor 254 due to current flowing in tube 251 biases tube 253 to cut off. However, when pulses are being received by tube 231, pulses are received by the grid of tube 251 and drive this grid positive on the peaks of the pulses whereby the grid takes current. The grid current charges the condenser 248 which develops a negative voltage and thus biases tube 251 to cut off. During this condition, if tube 253 has voltage applied to its plate, current will flow therethrough and will flow through resistor 254. Due to this current, a bias voltage develops across resistor 254, but this is a normal bias voltage and tube 253 conducts sufficient current to initiate operation of certain relays, as will be described subsequently.

The functioning of tubes 251 and 253 initiate and control operation of the input control relays 229 which comprise relays 256, 257, 258 and 259. Functioning of relays 256, 257 and 259 determines functioning of relay 258, as will be described in greater detail in connection with Fig. 11 to control relays 224, 224*a* to effect appropriate switching connections to the memory circuits and to output control relays 522 in connection with punch 72.

Before the apparatus of Figs. 10*a* and 10*b* is turned on, that is, before plate voltage is first supplied to the various tubes, etc., the various contacts of relays 256, 257, 258 and 259 occupy the position shown in Figs. 10*a* and 11. As soon as the apparatus is turned on, B+ or plate voltage is supplied to the plate of tube 251 through a circuit extending from B+ through resistor 260, the plate of tube 251, conductor 250, and resistor 254 to ground. Plate current flows through the circuit described and produces a voltage drop across resistor 254, which voltage drop biases tube 253 to cut off as already described. The plate circuit of tube 253 is complete at this point and may be traced as follows: From B+ through conductors 271 and 272, coil 273 of relay 256, conductor 274, normally closed contacts 275 of relay 256, conductor 276 to the plate of tube 253, through the cathode thereof and resistor 254 to ground. Due to normally open contacts in other circuits, no further operation occurs, at this point, since no pulses are being received (the apparatus has just been turned on). The relays 224 and 224*a* which are controlled through the relay combination 229 accordingly remain in their initial position.

When pulses are received, however, tube 251 becomes nonconducting, as already described. Hence the voltage developed across resistor 254, due to current flow through tube 251, disappears, that is, the bias is removed from tube 253 and this tube conducts through the plate circuit just described. Hence, tube 253 conducts and relay 256 operates thereby opening normally closed contacts 275 and closing the normally open contacts 277 and 278. Closing contacts 277 forms a holding circuit for coil 273 which may be traced as follows: From B+ through conductors 271 and 272, coil 273, conductors 274 and 279, closed contacts 277, conductor 281, resistor 282, conductor 283, normally closed contacts 284 of relay 259, and conductor 285 to ground. The resistor 282 restricts the current through coil 273 to a proper value and relay 256 remains in its operative condition. Opening contacts 275, accordingly, does not effect energization of coil 273, but it removes the plate voltage from tube 253. Closing contacts 278 completes a circuit for operating relay 258 which may be traced as follows: From B+ through conductor 271, closed contacts 278, conductor 286, coil 287 of relay 258, conductor 288, normally closed contacts 289 of relay 257, conductors 291 and 292, the plate of tube 251, the cathode thereof, conductor 250, and resistor 254 to ground. Current, however, does not flow in this circuit, at this time, since tube 251 is biased to cut off by the pulses being received.

Hence, at this point the normally open contacts 293, 294, 295 and 296 of relay 258 remain open and the normally closed contacts 297 remain closed. The contacts 295 control operation of relays 224 and **224*a* for switching the counters from one memory circuit to the other. The contacts 296 and 297 comprise the two parts of a single pole, double throw switch and control relays 298 and 299 for providing bias to the tubes of the memory circuits in proper order, as will be described more completely subsequently in this specification. Since relay 258 does not operate just yet, the relays 224, 224*a*, 298 and 299, remain in their positions when pulses are received and continue to do so until both identification and information pulses stop. When these pulses stop, the bias is removed from tube 251 and this tube immediately conducts. At the same time, a bias voltage is developed across resistor 254, but no current flows in tube 253 in any event since contacts 275 are held open. As soon as tube 251 conducts, current flows through coil 287 of relay 258, through a circuit previously traced, thereby causing this relay to close its normally open contacts 293, 294, 295 and 296 and to open its normally closed contacts 297. This effects operation of the relays 224, 224*a*, 298 and 299** to cause the counters to be switched to the other memory circuit, appropriate bias voltages to be applied, and the counter to be cleared.

Closing contacts 294 forms a holding circuit for coil 287 which may be traced as follows: From B+ through conductor 271, closed contacts 278, conductor 286, coil 287, conductor 301, closed contacts 294, resistor 302, conductor 283, closed contacts 284, and conductor 285 to ground. Accordingly, relay 258 remains energized. Since tube 251 is conducting through the circuit previously traced out, the bias voltage for tube 253 developed across resistor 254 cuts off tube 253 even though plate voltage is now applied thereto through the following circuit: From B+ through conductors 303, 304, 305 and 306, closed contacts 293, conductor 307, coil 308 of relay 257, and conductors 309 and 276 to the plate of tube 253.

Assume now that pulses are again being received by tube 231 from heads 177 and 174. Tube 251 immediately becomes nonconducting thereby removing the bias from tube 253 which immediately conducts through the circuit just traced. Accordingly, current flows through coil 308 causing relay 257 to open its normally closed contacts 289 and to close its normally open contacts 311 and 312. Closing normally open contacts 311 provides a holding circuit for coil 308 which may be traced as follows: From B+ through conductors 303, 304, 305, and 306, closed contacts 293, conductor 307, coil 308, conductors 309 and 316, closed contacts 311, conductor 317, resistor 318, conductor 283, closed contacts 284, and conductor 285 to ground. Accordingly, relay 257 remains energized.

Closing contacts 312 completes an energizing circuit for coil 315 of relay 259 which may be traced as follows: From B+ through conductors 303 and 313, closed contacts 312, conductor 314, coil 315 of relay 259, and conductor 292 to the plate of tube 251. No current flows, however, because tube 251 is non-conducting due to the reception of pulses and normally closed contacts 289 are opened. Due to the operation of relay 257, no further operation of relay 258 occurs. Accordingly, the relays 224, **224*a*, 298 and 299 remain in their present positions while pulses are coming through. However, when the reception of pulses by tube 231 ceases, that is, both identification pulses and information pulses cease, tube 251 becomes conducting thereby permitting flow of current through coil 315 by means of the circuit previously traced. Accordingly, relay 259 becomes energized and opens its normally closed contacts 284 thereby interrupting the holding circuits for coils 273, 308 and 287 whereby each of these relays assumes its normally inoperative position. Contacts 284, however, immediately close since this is the normal condition thereof in order that the holding circuits may be established when a new series of operations occur. Accordingly, the normally open contacts 295 of relay 258 again become open thereby causing the relays 224, 224*a* to connect the counter to the other memory circuit and to clear the counter. Likewise, the de-energization of coil 287 causes contacts 296 to become open and contacts 297** to become closed thereby changing the bias voltages of the tubes in the memory circuits.

Actuation of relays 224, **224*a* brought about by the energization and de-energization of relay 258 effects operation of normally closed contacts 319 and normally open contacts 321** (Fig. 10*b*) which cooperate with a circuit at the punch end of the apparatus for a purpose to be described subsequently in this specification.

The relays 256, 257, 258 and 259 having now assumed their initially inoperative position, tube 251 blocks conduction of tube 253 and permits operation of relay 256 only when a new series of pulses are received.

When the apparatus is first energized and when pulses are first received, the relay 258 remains unenergized as shown. Hence, contacts 295 remain open and an energizing circuit for coil 410 of relay 224, **224*a*** remains uncompleted. Hence, these relays remain in the position shown in Fig. 10*b* until after the first group of pulses have started and stopped. When the first group of pulses has stopped, relay 258 becomes energized and closes contacts 295 thereby completing an energizing circuit for coil 410 as follows: From B+ (Fig. 10*a*), through conductors 303, 304, and 305, closed contacts 295, and conductor 411, through coil 410 (Fig. 10*b*) to ground. Hence, relays 224, **224*a* pick up and move the contact bars thereof to the positions shown dotted, thereby changing the connections of the memory circuits. While contacts 295 of relay 258 are open, contacts 297 thereof are closed thereby completing a circuit for energizing coil 412 of relay 299** (Fig. 10*b*) as follows: From B+ (Fig. 10*a*) through conductors 303 and 304, closed contacts 297, and conductor 413 through coil 412 to ground. Accordingly, coil 412 of relay 299 is energized. When contacts 295 close, contacts 297 open and contacts 296 close thereby removing the energization from coil 412 and supplying energization to coil 414 of relay 298 through a circuit as follows: From B+ (Fig. 10*a*) through conductors 303 and 304, closed contacts 296, and conductor 415 through coil 414 to ground. Accordingly, coil 414 becomes energized.

Whenever relays 224, **224*a* function, i. e. to open or to close, the contacts 187 are momentarily opened to remove voltage momentarily from the counters to clear them. The contacts 187** are set to operate after the bias has been removed from the memory circuit tubes to permit the signals on the counter to be applied to the memory circuit.

The groups of tubes 188 and 189 are identical with each other. Within group 188 only the tubes in horizontal rows 191 and 193 will have their circuits specifically describe, inasmuch as the tubes in horizontal row 192 are connected similar to those in horizontal row 191, and the tubes in horizontal rows 194 and 195 are connected similarly to the tubes in horizontal row 193. The differences in the circuits between the tubes of the respective horizontal rows will become apparent.

The tubes of both groups 188 and 189 are gas filled tubes of the thyratron type, for example of the type 2D21, and each tube includes a plate, suppressor and control grids, and a cathode. When plate voltage is applied to the tubes, and when positive voltages are applied to both of the grids, plate current will flow which, after beginning to flow, cannot be interrupted except by removing the plate voltage or opening the cathode-plate circuit of the tube, as is well understood. Even though plate voltage is applied to the tubes when either of the grids or both of them have negative voltages applied thereto, then the tubes will not conduct. Hence, by connecting the grids of the tubes in proper fashion to the binaries and rings of the counters, proper operation is obtained.

Alternate ones of the tubes in row 191, that is, tubes 331, 332, 333, 334 and 335, have their suppressor grids connected to a conductor 336 and thus to the contacts 337 (closed) of relays 224, 224*a*, and alternate tubes 338, 339, 341, 342 and 343 have their suppressor grids connected to conductor 344 and thus to the contacts 345 (closed) of relays 224, 224*a*. Contacts 337 are connected through conductor 346 to the upper binary unit (5, 6, 7, 8, 9) of counter stage 226, and contacts 345 are connected through conductor 347 to the lower binary unit (0, 1, 2, 3, 4) of counter stage 226. The control grids of each pair of adjacent tubes, for example tubes 331 and 338, are connected together by means of resistors 348 and 349, respectively, to a conductor 351, thus to the contacts 352 (closed) of relays 224, 224*a* and through conductor 353 to the 4, 9 tube unit of the ring of counter stage 226. Similarly, the control grids of tubes 335 and 343 are connected through equal resistors 354 and 355 to a conductor 356, thus to the contacts 357 (closed) of relays 224, 224*a* and through conductor 358 to the 0, 5 tube unit of the ring of counter stage 226. Similarly, tubes 332 and 339, tubes 333 and 341, and tubes 334 and 342 have their control grids connected together and to conductors, respectively, 361, 362 and 363 (shown only partially in Figs. 10*a*, 10*b*, and 10*c*), the conductors 361, 362 and 363 being connected, respectively, through contacts (closed) of the relays 224 and 224*a* (not shown but to be enclosed in the dotted rectangle 360) to the tube units (1, 6), (2, 7), and (3, 8) of the ring of counter space unit 226.

The conductors 336 and 344 are connected through resistors 364 and 365, respectively, to the contacts 366 (closed) of relay 299 and thus to a negative D. C. voltage which applies a superseding bias to the suppressor grids of each of the tubes in the horizontal row 191. The plates of each of the tubes in row 191 are connected through current limiting resistors, respectively, (resistor 369 for tube 331) as shown to a conductor 367 to a source of B+ voltage. The cathodes of each of the tubes in row 191 are connected to a common conductor 368.

The tubes of horizontal row 192 are connected similarly to the tubes in row 191. That is, the suppressor grids of alternate tubes are connected together to the upper unit of the binary of counter stage 227, the suppressor grids of the remaining tubes are connected to the lower binary unit, and the control grids of each pair of adjacent tubes are connected together through contacts (closed and not shown) of relays 224, 224*a* to the units of the ring of counter stage 227 corresponding to the same ring units of counter stage 226 as the corresponding tubes in horizontal row 191 are connected to. Likewise, the cathodes of the tubes in row 192 are connected also to a common conductor 371 (Fig. 10*c*). Biasing contacts similar to contacts 366 are also arranged for the tubes in row 192.

Referring to horizontal row 193, alternate ones of the tubes, that is, tubes 372, 373, 374, 375 and 376 have their suppressor grids connected to conductor 377 and thus to the contacts 378 (closed) of relays 224, 224*a*; and alternate tubes 379, 381, 382, 383 and 384 have their suppressor grids connected to conductor 385 and thus to the contacts 386 (closed) of relays 224, 224*a*. Contacts 378 are connected through conductor 387 to the upper binary (5, 6, 7, 8, 9) of counter stage 182 and contacts 386 are connected through conductor 388 to the lower binary unit (0, 1, 2, 3, 4) of counter stage 182. The lower grids of each pair of adjacent tubes, for example tubes 372 and 379, are connected together by means of resistors 389 and 391, respectively, to a conductor 392, thus to contacts 393 (closed) of relays 224, 224*a* and through a conductor 394 to the 4, 9 tube unit of the ring counter stage 182. Similarly, the control grids of tubes 376 and 384 are connected through equal resistors 395 and 396 through a conductor 397, thus to contacts 398 (closed) of relays 224, 224*a* and through conductor 399 to the 0, 5 tube unit of the ring counter stage 182. Similarly, tubes 373 and 381, tubes 374 and 382, and tubes 375 and 383 have their control grids connected together and to conductors, respectively, 402, 403 and 404 (shown only partially in Figs. 10*a*, 10*b*, and 10*c*), the conductors 402, 403 and 404 being connected respectively through normally closed contacts of the relays 224 and 224*a* (not shown but to be enclosed in the dotted rectangle 360) to the ring units (1, 6), (2, 7) and (3, 8) of the ring of counter stage 182.

The conductors 377 and 385 are connected through resistors 405 and 406, respectively, to the contacts 407 (closed) of relay 299 and thus to the negative D. C. voltage which applies a superseding bias to each of the tubes in the horizontal row 193. The plates of each of the tubes in row 193 are connected through current limiting resistors, respectively (resistor 418 for tube 372) as shown, to a conductor 419 to a source of B+ voltage (Fig. 10*c*). The cathodes of each of the tubes in row 193 are connected to a conductor 421. The tubes of horizontal rows 194 and 195 are connected similarly to the tubes in row 193. That is, the suppressor grids of alternate tubes in row 194 are connected together to the upper unit of the binary of counter stage 183, the suppressor grids of the other tubes of row 194 are connected to the lower binary unit, and the control grids of each pair of adjacent tubes in row 194 are connected together through contacts (closed and not shown) of relays 224, 224*a* to the units of the ring of counter stage 183 corresponding to the same ring units of counter unit 182 as the corresponding tubes in horizontal row 193 are connected to. Correspondingly, the tubes in row 195 are connected through relays 224, 224*a* to the proper binary unit and ring units of counter unit 184. The cathodes of tubes in rows 194 and 195 are connected, respectively, to conductors 422 and 423 (Fig. 10*c*).

Biasing contacts are arranged for the tubes in rows 194 and 195 similar to the contacts 407 for tubes in row 193.

The tubes in group 189 are connected in the same manner as the tubes in group 188. Rows and columns of tubes in group 189 corresponding to those in group 188 are shown complete and incomplete, respectively. The tubes in horizontal row 211 are connected similarly to the tubes of horizontal row 191 and are connected to corresponding contacts (open) of relays 224, 224*a*. Thus, alternate ones of the tubes in row 211 have their suppressor grids connected together and through conductor 424 to the contacts 337 (open) and the remaining ones of the tubes in row 211 have their suppressor grids connected and through a conductor 425 to the contacts 345 (open). Conductors 424 and 425 are connectible through resistors 426 and 427, respectively, through contacts 428 (closed) to a negative voltage for supplying a superseding bias to these tubes. The control grids of adjacent pairs of tubes in row 211 are connected together through resistors and through appropriate conductors (not all shown) to contacts of relays 224, **224*a*. Thus, the control grids of tubes in row 211 and in columns 196 and 197 are connected through a conductor 429 to the contacts 352 (open), and the control grids of the tubes in row 211 and in columns 205 and 206 are connected through a conductor 431 to the contacts 357 (open). The cathodes of the tubes in row 211 are connected to a conductor 432. The plates of the tubes in row 211 are each connected through a current limiting resistor, respectively, to a conductor 434** and thus to a source of voltage B+ (Fig. 10*c*).

The tubes of row 212 are connected similarly to the tubes of row 211 and particularly are associated with normally open ones of contacts of relays 224 and **224*a* for which the tubes of row 192 are associated with normally closed contacts. The cathodes of the tubes in row 212 are connected to a conductor 433** (Fig. 10*c*).

The tubes of row 213 are connected similarly to the tubes in row 193 and to corresponding contacts (open) of relays 224, **224*a*. Thus, alternate ones of the tubes in row 213 have their suppressor grids connected through a conductor 435 to the contacts 378 (open) and the remaining ones of tubes in row 213 have their suppressor grids connected through a conductor 436 to the contacts 386 (open). Conductors 435 and 436 are connectible through resistors 437 and 438 and contacts 439 (closed) to a source of negative voltage, as shown, for applying a superseding bias to these tubes. The control grids of adjacent pairs of tubes in row 213 are connected together and through conductors (not completely shown) to normally open contacts of relays 224, 224*a*. Thus, the control grids of the tubes in row 213 and columns 196 and 197 are connected together through resistors and through conductor 441 to the contacts 393 (open), and the control grids of the tubes in row 213 and columns 205 and 206 are connected together through a conductor 442 to the contacts 398 (open). The cathodes of the tubes in row 213 are connected to a conductor 443. The plates of the tubes in row 213 are connected through current limiting resistors, respectively, to a conductor 444** to a source of B+ voltage (Fig. 10*c*).

The tubes in rows 214 and 215 are connected similarly to the tubes of row 213 and particularly are associated with normally open ones of contacts of relays 224, **224*a* for which the tubes of rows 194 and 195 are associated with normally closed contacts. The cathodes of the tubes in rows 214 and 215 are connected to conductors 445 and 446** (Fig. 10*c*). Superseding bias contacts are, of course, also provided for the tubes in rows 214 and 215 corresponding to contacts 439 of row 213.

While not shown, it will be understood that the plates of the tubes in all rows are connected to individual current limiting resistors and to the source of B+ voltage.

The apparatus following the memory circuits and cooperating therewith in connection with the punch mechanism 172 may now be described.

Referring particularly to Fig. 10*c*, the punch mechanism 172 may comprise a series of electromagnetic punches 447, 448, 449, 451, 452 and 453 for punching holes opposite numbers in rows on a card 454. The punch 447 punches a hole indicating the particular channel of data being recorded, punches 448 and 449 punch holes indicating the identification of the particular instrument, and punches 451, 452, and 453 punch holes indicating the value of the data, that is, the number of pulses originally recorded.

The punch mechanism includes structure (not shown) for moving the card 454 through the punch mechanism, that is, past the series of punches in a step movement. As the card moves through the punch mechanism, the zeros in all of the columns of figures come opposite to the punches, followed by the ones, twos, threes, 4–9, etc. The punch mechanism includes apparatus 455 termed an emitter which includes a rotating contact arm 456 moving in unison with the card 454 so that the terminals numbered 0, 1, 2, 3, and 4–9, respectively, are contacted by the contact arm as the corresponding numbers on the card come opposite the punches. Driving mechanism, both for moving the card and for rotating the emitter arm 456, is shown schematically as a motor 457 and a clutch 458 which may be actuated by a coil 459.

Referring to Figs. 9 and 10*c*, it will be noted that when memory circuits 221 and 223 are connected to the counters 180 and 209, memory circuits 222 and 224 are connected to the punch. Hence, the tubes of the group 189 are connected to the punch 172 (Fig. 10*c*). However, since the circuit of the tubes in group 188 has been described somewhat more completely, the complete circuit will be described in connection with these tubes and appropriate references made to the tubes of group 189.

The cathodes of the tubes in horizontal rows 191, 192, 193, 194 and 195 are connected, respectively, through the associated conductors 368, 371, 421, 422 and 423 through normally closed contacts 461, 462, 463, 464 and 465 of relay 466 and through the current limiting resistors 467, 468, 469, 471 and 472, respectively, to ground. From the resistor side of contacts 461 to 465 inclusive, the cathodes of the tubes in the respective rows are connected through conductors 473, 474, 475, 476 and 477 to normally open (shown dotted) ones of the contacts 479, 478, 483, 482 and 481, respectively, of relays 225, **225*a*. Through contacts 478, 479, 481, 482 and 483, when closed, the punches 448, 449, 451, 452 and 453 are connected into series circuit with the tubes in respective columns and rows of the memory circuits. The plates of the tubes in vertical column 196 are connected on the plate side of the current limiting resistors, for example, resistors 369 and 418 of tubes 331 and 372** (Fig. 10*b*), to a conductor 484 (Figs. 10*b* and 10*c*) and thus to the terminal numbered 9 of emitter 455. Correspondingly, the plates of tubes in vertical column 206 are connected on the plate sides thereof to a conductor 485 and thus to the terminal numbered 0 of emitter 455. Correspondingly, the plates of the tubes in vertical columns 197, 198, 199, 201, 202, 203, 204 and 205 are connected, respectively, by means of conductors 486, 487, 488, 489, 491, 492, 493 and 494, shown incompletely in Figs. 10*b* and 10*c* to the terminals numbered, respectively, 4, 8, 3, 7, 2, 6, 1 and 5 of the emitter.

The cathodes of tubes in horizontal rows 211–215 (group 189) are connected by means of the conductors 432, 433, 443, 445 and 446 through the normally closed contacts 395, 496, 497, 498 and 499 of relay 561, and through current limiting resistors 501, 502, 503, 504 and 505, respectively, to ground. From the resistor side of contacts 495–499 inclusive, the cathodes of the respective rows of tubes are connected through conductors 506, 507, 508, 509 and 511 to the normally closed ones of contacts 479, 478, 483, 482 and 481. The plates of tubes in the vertical columns 196, 197, 198, 199, 201, 202, 203, 204, 205 and 206 of the group of tubes 189 are connected by conductors to the same numbered terminals of emitter 455 as are the plates of tubes in the corresponding columns of group 188, this being indicated by having the conductors 484, 485, 486, 487, 488, 489, 491, 492, 493 and 494 connect with the plates of all tubes in the respective vertical columns.

The normally closed contacts 461–465, inclusive, are actuated by coil 512 of relay 466 and the normally closed contacts 495–499, inclusive, are actuated by coil 559 of relay 561 for opening the tube circuits at the appropriate time to interrupt the current flow and thus to clear any signals from the respective memory circuits. The contacts 478, 479, 481, 482 and 483, forming part of relays 225, 225*a*, are actuated by coil 513 for connecting the memory circuits to the punches. The movable portions of contacts 478, 479, 481, 482 and 483 are connected by means of conductors 514, 515, 516, 517 and 518 to the punch magnets 448, 449, 451, 452 and 453, respectively. Also arranged to be actuated by coil 513 are contacts 554 forming part of an automatic start circuit for the punch, as will be described.

The relays 225, 225*a* are termed the output swing relays in Fig. 9 inasmuch as they connect the punch magnets from one memory circuit to the other, the output swing relays being controlled by the output control relays 522.

The structure and operation of output control relays 522 may best be understood by referring to Figs. 10*c* and 12. The output control relays 522 comprise four relays 523, 524, 525 and 526. When the apparatus is first turned on, that is, when B+ voltage is first applied, the various contacts of the relays occupy the positions shown, that is, none of the relays are energized.

The impulse to cause the control relays 522 to go into operation comes when the punching operation is complete since it is at this point that it is desired to switch from one memory circuit to the other in order to punch the next card. Hence, when the contact arm 456 of the emitter, in rotating counterclockwise, engages the terminal 527, the punching operation is complete and a circuit through coil 528 of relay 523 is completed as follows: From B+ through contact arm 456, terminal 527, conductor 529, and coil 528 to ground. No other circuit is completed at this point. Current flows through coil 528 thereby closing contacts 531 and 533 and opening contacts 532. Closing contacts 531 completes no further circuits at this point, and opening contacts 532 causes no further functions to occur. Closing contacts 533 completes an energizing circuit for coil 534 of relay 524 as follows: From B+ through conductors 535 and 536, closed contacts 537 of relay 526, conductors 538, 539 and 541, closed contacts 533, conductor 542, and coil 534 to ground. Coil 534 accordingly becomes energized and closes its normally open contacts 543, 544, 545 and 546.

Closing contacts 545 provides a holding circuit for coil 534 so that this coil remains energized when contacts 533 open, which holding circuit may be traced as follows: From B+ through conductors 535 and 536, closed contacts 537, conductors 538 and 539, conductor 547, closed contacts 545, conductors 548 and 542 to coil 534 to ground.

Closing contacts 546 completes an energizing circuit for coil 513 of relays 225, 225*a*, which may be traced as follows: From B+ through conductors 549, 551 and 552, closed contacts 546, conductor 553 and coil 513 to ground. Thereupon coil 513 becomes energized and causes relays 225, 225*a* to operate (i. e. causes the moving arms of contacts 478, 479, 481, 482 and 483 to change from their positions shown solid to those shown dotted), thereby switching the punch magnets from one memory circuit to the other. Likewise, this causes contacts 554 to change positions. Closing contacts 544 of relay 524 at this point produces no further operation since contacts 532 of relay 523 are still open.

Closing contacts 543 of relay 524 energizes coil 555 of relay 556 through a circuit which may be traced as follows: From B+ through conductors 549 and 551, closed contacts 543, conductor 557, and coil 555 to ground. Energizing coil 555 causes the double throw contacts 558 to momentarily open and close and thereby momentarily interrupting the circuit from B+ to coil 559 of relay 561, this latter circuit extending from B+ through one or the other of contacts 558, conductors 562 and 563, and coil 559 to ground. De-energizing coil 559 momentarily, and re-energizing it, causes the contacts 495–499, inclusive, to open and close thereby clearing the memory circuit No. 2, i. e. 222 and 224.

The energization of coil 528 of relay 523 was only momentary since the circuit thereof was closed through the moving contact arm 456. Hence, coil 528 becomes de-energized and opens contacts 531 and 533 and closes contacts 532. Opening contacts 533 serves no purpose since coil 534 is held in through its own circuit. Opening contacts 531 serves no purpose since it completed no circuits on closing. Closing contacts 532, however, completes an energizing circuit for coil 564 of relay 525 which may be traced as follows: From B+ through conductors 549, 565 and 566, closed contacts 532, conductor 567, closed contacts 544 (coil 534 is energized), and coil 564 to ground. Energizing coil 564 closes the normally open contacts 568 and 569. Closing contacts 569 provides a holding circuit for coil 564 which may be traced as follows: From B+ through conductors 535 and 536, closed contacts 537, conductors 538 and 571, closed contacts 569, conductor 572, and coil 564 to ground. Coil 564 accordingly remains energized. Closing contacts 568 produces no further function at this point inasmuch as contacts 531 of relay 523 are open.

Contact arm 456 has now completed one revolution and on its next revolution it again engages contact 527 (a punch cycle is ended) thereby supplying energization to coil 528 through the circuit previously described. Coil 528 accordingly causes contacts 531 and 533 to close and 532 to open. Closing contacts 533 produces no function since coil 534 is already energized. Likewise, opening contacts 532 produces no function since coil 564 is held in. Closing contacts 531, however, completes an energizing circuit for coil 573 of relay 526, which circuit may be traced as follows: From B+ through conductors 549 and 565, closed contacts 531, conductor 574, closed contacts 568, and coil 573 to ground.

Energizing coil 573 closes the normally open contacts 575 and 576 and opens normally closed contacts 537. Closing contacts 576 provides a circuit for energizing coil 559 of relay 561 which may be traced as follows: From B+ through conductors 535 and 536, closed contacts 576, conductors 577 and 563, and coil 559 to ground. This circuit is provided in order to prevent de-energization of coil 559, at this point, since opening contacts 537 interrupts the holding circuit for coils 534 and 564, whereupon relays 524 and 525 become de-energized and consequently coil 555 of relay 556 is de-energized and causes operation of its contacts 558 which would momentarily interrupt the previously traced circuit to coil 559, all for the purpose to be subsequently described. Closing contacts 575 provides an energizing circuit for coil 578 of relay 579 through a circuit which may be traced as follows: From B+ through conductor 535, closed contacts 575, conductor 581, and coil 578 to ground. Accordingly, coil 578 becomes energized and causes its contacts 582 to close and thereby re-establish a circuit to coil 512 of relay 466 which may be traced as follows: From B+ through the closed contacts 582, conductor 583, and coil 512 to ground. Establishing the circuit of coil 512 causes this coil to open the contacts 461–465, inclusive, thereby clearing the memory circuit No. 1, i. e. 221 and 223.

When contacts 537 of relay 526 have opened, the relays 524 and 525 becomes de-energized due to the holding circuits of coils 534 and 564 being broken, and since the contact arm 556 moves away from the terminal 527, relay 523 becomes de-energized and so consequently does relay 526 (contact 531 opens) and the circuit is ready for a repeat operation. The coil 578 is, then, de-energized and contacts 582 open; coil 512 is de-energized and contacts 461–465 close for memory circuit No. 1 to be ready again. Hence, as the relays 522 function, the punch is switched from one memory circuit to the other whenever the emitter, that is, the contact arm 456, indicates that a punching cycle is complete. At the end of the first punching cycle the relay 524 operates to close its contacts 546 to effect switching of the punch from one memory circuit to the other, and when the machine has completed its second cycle of punching, the relay 526 causes contacts 537 to open, thereby effecting switching of the punch from the other memory circuit back to the one.

At the end of one punching cycle, relay coils 513 and 555 are energized. Energizing coil 513 shifts the contacts 554 from one position to the other and energizing coil 555 effects clearing of the one memory circuit by momentarily opening the circuit to coil 559. At the end of the next punching cycle relay coils 513 and 555 are de-energized. The de-energizing coil 513 shifts the contacts 554 from the other position to the one. Energizing coil 578 (only momentarily) clears the other memory circuit by effecting opening of circuit to coil 512. De-energizing coil 555 does not cause clearing of the one memory circuit because the momentary closing of contacts 576 energizes coil 559 until contacts 558 have released due to de-energizing coil 555. Hence, the one memory circuit remains as it should be until the relay 524 operates again. The contacts 554 cooperate with the contacts 319 and 321 of relays 224, **224*a*** (Figs. 10*b* and 12) to provide an automatic start signal for the punch machine. The circuit for causing the clutch 458 to be energized to effect operation of the punch, that is, movement of the emitter and intermittent movement of the card, etc., may be traced as follows: From B+ through coil 459, conductor 584, and open contacts 585 to ground. The contacts 585 are closed by energizing coil 586. Coil 586 needs only momentary energization to close contacts 585 whereafter these contacts remain closed and the clutch 458 remains engaged. Connected to the clutch is a rotating cam 587 which makes one revolution with every revolution of the contact arm 456. And when contact arm 456 engages terminal 527, that is, a punching cycle is complete, the cam 587 has its lug engage the moving arm of contacts 585 thereby opening these contacts and de-energizing the clutch whereupon the punch machine stops until another automatic start signal is begun which again energizes coil 586.

The punch should not start its punching operation, that is, no automatic start signal should be received until the memory circuit which is remembering the information to be punched has been disconnected from the counter and the punch has been connected thereto. Thus, when the punch is connected to the memory circuit No. 2, that is, when contacts 478, 479, 481, 482 and 483 are in their solid line positions, the contacts 337, 345, 352, 357, 378, 386, 393, 392 and etc. (Fig. 10*b*) should be in their solid line positions thereby disconnecting memory circuit No. 2 from the counters and connecting the memory circuit No. 1 to the counters. Under this condition, the punch operating motor 457 should begin the punching operation, that is, coil 586 should be and is energized through a circuit extending as follows: From B+ (Figs. 10*c* and 12) through conductor 588, closed contacts 319 (Figs. 10*b* and 12), conductor 589, closed contacts 554, conductor 591, and coil 586 to ground. Accordingly, the punch cycle is begun and continues until arm 456 has made a complete revolution, that is, contacts 585 are opened by cam 587. At the end of this punching cycle the contacts 554 change to the dotted position (together with contacts 478, 479, 481, 482 and 483) and the previously traced circuit for coil 586 is interrupted. Consequently, the punch machine waits for a second automatic start signal which comes when the counter has finished its counting operation and changes the contacts 337, 345, 352, 357, 378, 386, 393, 398 and 321 to the dotted positions thereby freeing memory circuit No. 1. The automatic starting circuit for coil 586 may now be traced as follows: From B+ (Figs. 10*c* and 12) through conductor 588, closed contacts 321 (Figs. 10*b* and 12), conductor 592, contacts 554 (dotted), conductor 591, and coil 586 to ground. Hence, contacts 585 are closed and the punch begins a new cycle of operation.

The operation of the input switching relays 224, **224*a***, the counter circuits Nos. 1 and 2, and certain other components of the apparatus may best be understood by considering Fig. 13 in connection with Figs. 10*a*, 10*b* and 10*c*. In Fig. 13 there is shown a tube which may be any one of the tubes of either of the memory circuits, and for purposes of explanation is taken as tube 343 of group 188. In Fig. 13 the tube and the associated structure are shown as might be the case during operation when the punch 172 is connected for punching the data on memory circuit No. 2 (group of tubes 189), and the tubes of memory circuit No. 1 (group of tubes 188) are connected to the counters for receiving the signal corresponding to the succeeding data. Hence, the suppressor grid of the tube 343 is connected through conductor 344, closed contacts 345 and conductor 347 to the lower binary unit of counter stage 226. The control grid is connected through the resistor 355, conductor 356, normally closed contacts 357, and conductor 358 to the 0,5 unit of the ring of counter 209. There is also a superseding negative bias applied to each of these grids through the resistors 364 and 365 and the contacts 366 from a suitable source of negative voltage, as shown.

Plate voltage is applied to the tube from a source of B+ through a suitable resistor 593 and the plate cathode circuit is completed through normally closed contacts 461 and a resistor 467 to ground. The punch magnet 449 is shown disconnected from the tube circuit by contacts 478 since, under the condition assumed, the punch magnet is connected to the other memory circuit, that is, the one of which tube 343 is not a part. The condition of the tube 343, as shown in Fig. 13, may be that after the various voltages have been applied and the tubes in group 188, memory circuit No. 1, are connected to the counter. As the instant of applying the various voltages the negative voltage applied through contacts 366 to the grids is applied slightly before the plate voltage B+ is applied so that the tube does not conduct, the bias on the grids preventing it. As pointed out previously, for the tube 343 to conduct, both grids must be made positive at the same time. The clearing switch 461 is closed. While the tubes of group 188 are connected to the counter 209, the contact arm 465 of the emitter is rotating and engages the terminal 0 at the end of conductor 485. This, of course, applies voltage to the plate of tube 343 without the presence of resistor 593. This voltage, however, also does not cause the tube to conduct because of the presence of the bias on the grids.

It is assumed now that the counter 209 has finished counting the pulses of a particular series of data, this being noted by the input control relays 229 and isolation amplifier 228. Relay 258 of the input control relays acts through circuits as traced out previously to cause relays 224, **224*a* to shift the contacts 337, 357, and etc. from the position shown solid in Fig. 13 to the position shown dotted. Just prior to the change in position of contacts 337, 357, etc. the bias is removed from both grids by the momentary opening of contacts 366 due to the energization of coil 412 also controlled by relay 258. At the instant the contacts 366 are open, the signal remaining on the tubes of counter 209 is placed upon the grids of the tube 343 and other tubes in the memory circuit, that is, contacts 337 and 357 at this precise instant have not yet opened. Due to the presence of B+ voltage on the plate of tube 343 through resistor 593, the closed contacts 461 and resistor 467, tube 343 conducts, but the current flowing is small due to the presence of the resistors 467 and 593. Contacts 345 and 357 now continue their opening movement, and likewise contacts 366 continue their movement and supply bias again to the grids of the tube. However, since plate current is now flowing, even though it is small, the imposition of grid bias does not have any effect, as is well understood. Hence, tube 343** "remembers" the signal applied to it, which in the present instance means that the tube is conducting.

It is assumed now that the punch has completed its punching operation for memory circuit No. 2, that is, group of tubes 189, and has been switched over to memory circuit No. 1, group of tubes 188. That is, coil 513 has been energized as previously described to cause contacts 478 to close and to place punch magnet 449 in parallel with resistor 467. A small amount of current now flows in the punch magnet 448 but the presence of resistor 593 prevents any substantial amount of current flowing. Hence, the punch 448 does not operate. When punch 172 receives its automatic start signal, as previously described, that is, when punch 172 has completed one punching operation and the memory circuits have been switched properly, the contact arm 465 begins to rotate and engages the zero terminal at the end of conductor 485. The voltage applied to the plate of tube 343 now by-passes resistor 593 in effect and the circuit for the punch magnet starts from B+, extends through contact arm 465, conductor 485, plate-cathode of tube 343, closed contacts 461, closed contacts 478, and punch 448 to ground. The punch receives a large slug of current and thus punches a zero in the appropriate column of the card underneath it. As soon as arm 465 moves away from the terminal of conductor 485 the only voltage applied to the tube is that through resistor 593 and hence the plate current is reduced to a very low value and the punch returns to its normal position. In this manner the contact arm 465 engages each of the terminals 1, 2, 3, 4, 5, 6, 7, 8 and 9 and thereby energizes all of the tubes in the vertical columns.

Tube 343 is in vertical column 206 and all of the tubes in this column have plate voltage applied at this instant. Even though this is true of the tubes in group 189, these tubes do not conduct because of the superseding grid bias applied thereto, as already explained. If any other tubes in the vertical column 206 have had an appropriate signal applied thereto from the counter in the manner as previously described for tube 343, the punch magnet connected thereto will function. This process continues as the emitter rotates, that is, as the contact arm 456 engages the terminals 1, 2, 3, 4, 5, 6, 7, 8 and 9 of the emitter a circuit is completed by means of the conductors connected thereto to the appropriate vertical column of the memory circuits. The complete conductors from the terminals 1, 2, and 3–8 are not shown in the interest of drawing simplicity, but the circuits may be completed by considering the terminals of the emitter and the conductors of the memory circuits bearing the same reference characters as being connected.

When the punching operation is complete, the emitter contact arm 456 has made a complete revolution and has engaged terminal 527. Each of the vertical columns, then, has been sensed (has been given an opportunity to supply current to the appropriate punch magnet) and the output control relays 522 cause the contacts 478 and etc. to shift from the position shown dotted in Fig. 13 to the position shown solid, thereby disconnecting the memory circuit of which tube 343 is a part from the punch circuit. Tube 343, however, if it was active, continues to be so until the coil 512 is energized under the control of relays 522 which cause to open momentarily the contacts 461—465 thereby breaking the plate-cathode circuit and thus removing the signal therefrom. After contacts 461 have closed again, there is no conduction because of the superseding bias on the grids. The counter of which tube 343 is a part has now been cleared and is ready for having the signal of another data group applied to it.

When, for example, in the condition shown in the drawings of Figs. 10*a* and 10*b*, the counters 209 and 180 are connected to the memory circuit No. 1, group of tubes 188, and the counters are receiving pulses from the pickup heads, no signals are applied to the tubes due to the presence of the superseding negative bias on the grids thereof. After the counters have completed counting, the particular tubes thereof indicating the number of the count will remain energized, as is well understood. Thus, for example, if six information pulses representative of a particular piece of data have been received, the tube unit 1, 6 of ring 160 and the upper tube unit of binary 185 of decade 182 are conducting. These two tube units, then, have a final output voltage which will be applied to all grids to which these units are connected. That is, the ring tube unit 1,6 has its signal connected through conductor 404 of the grids of tubes 375 and 383. The upper tube unit of the binary 185 has its signal applied through conductors 387 and 377 to the suppressor grids of tubes 372, 373, 374, 375 and 376. However, of this group of tubes, only tube 375 will come to a conducting condition, when the negative bias is removed therefrom and the signals from the counter are allowed to remain for an instant, because it is the only tube of this group both of whose grids receive signals. In a similar manner, if sixteen pulses, for example, are received, the tube unit 1,6 of ring 160 and the lower unit of binary 185 will have final signals thereon corresponding to six pulses. Similarly, the 1,6 tube unit of the ring of decade 183 and the lower one of the binary of this decade will have signals corresponding to 10 pulses. The signals or voltages of decade 183 then are applied to the appropriate tubes of horizontal row 194 in the manner as previously described whereupon the tube in this row which has positive voltages applied to both grids will become conducting. Similarly, the conducting condition of the tube units in decade 184 applies appropriate conducting signals to the tubes of row 195.

The counter 209 for the identification pulses functions in the same manner.

When the counting operation is complete and the relays 224, 224*a* have disconnected the counters, there will be tubes within the tube group 188 which will be conducting according to the binary system described. Then, when the punch is functioning, as the emitter contact arm 456 engages the various terminals, all of the tubes in the particular vertical column to which plate voltage is supplied will conduct if that tube has been rendered conducting. Thus, for example, if a particular piece of data is identified by zero identification pulses and zero information pulses, the punch machine will, when the contact arm engages the zero terminal of the emitter, cause all of the punches to punch zero at the same time. Likewise, if a particular piece of information is identified by 11 identification pulses and has 111 data pulses, when the emitter contact arm engages the terminal 1 the punch may punch holes opposite the numbers 1 across the card.

The punch 447 is supplied and is arranged to be ener- by the contact arm as it engages a terminal corresponding to the channel number of the pickup heads 171. That is, a particular tape may have several channels of information pulses on it and a particular one of these channels may be identified by the numbers 1, 2, 3 or 4. Then, if the channel 1 is being reproduced, it is desirable that the card contain this identification. Hence, by turning the selector switch 594 to terminal 1, the punch 447 is energized when the terminal 1 is engaged by the emitter contact arm to punch a number 1 for each bit of information in the number 1 channel. When the selector switch is turned to the position number 2, that is, the data in channel 2 is being sensed, then the punch 447 is energized only when the emitter contact arm engages terminal 2 and consequently a punch is placed opposite the number 2 on each card of information for channel 72. This process is carried out for each channel of information and may be effected by connecting punch 447 through conductor 595 to a selector switch 594 (Fig. 10*a*) which may be connected to terminals 1, 2, 3 or 4 in turn connected to the emitter terminals of the same number. Hence, for channel 2, the circuit extends from B+, through the arm 456, terminal 2 of the emitter, selector switch 594 (terminal 2), resistor 596, conductor 595, and punch magnet 447 to ground. When the emitter moves away from terminal 2, punch 447 moves to its normal position. The selector switch 594 may be operated at the same time that selector switch 178 is operated.

Throughout the explanation of operation of the reproducer, that is, the structure shown in Figs. 10*a*, 10*b*, 10*c*, etc., it has been assumed that the punch machine, once it is set into operation by receiving an automatic start impulse, will punch a card before the length of tape corresponding to the maximum number of information pulses, that is, 400 for the particular apparatus described, has been sensed. That is, the punch cycle is faster than a complete pickup cycle and thus there is no piling up of meaningless signals on the memory circuits. In essence, the operation is such that when the counters are connected to one memory circuit the other memory circuit is supplying signals to the punch and when the counters are connected to the second memory circuit the first memory circuit is supplying signals to the punch.

While the counting and memory operations have been described as comprising in a single counter and a pair of memory circuits, this is by way of example. Two counters with a single memory circuit for punching purposes may be utilized, in which instance the counters themselves are used as memory circuits. A single counter and a single set of thyratron tubes for punching may be used, but this slows down the counting operation.

If the instruments whose outputs are to be recorded on cards are near to the reproducer, the apparatus of Fig. 3 may be connected directly to the reproducer of Figs. 10*a*, 10*b*, and 10*c*. Thus, heads 24 and 26 are not used but the inputs thereto are connected directly to conductors 179 and 207, respectively. Recording on a tape initially, thus, is one manner of carrying out the method and utilizing the apparatus of the invention.

In reproducing the data, the apparatus described punches a card so that the number of pulses initially recorded is reproduced. The number of pulses is proportional to the value of the data, e. g. 10 pulses may represent one millivolt which is the unit of measurement. Hence, to obtain the instrument reading the number of pulses must be divided by the proportionality factor of 10. Usually the proportionality factor will be chosen to be a number such as 10 or 100 in order that conversion from pulses to instrument values is a simple process. Other proportionality factors, however, may be used, if desired or necessary. Automatic computing-punching machines of the character of punch 172 are well known for taking a number such as the number of pulses, dividing it by a factor and punching the instrument reading on a card. Hence, such a machine is not described, but the recording of data finally in this form is within the scope of the invention.

Another manner of obtaining the instrument values is to take the cards with the number of pulses punched thereon and pass them through a computing machine of the type made by the International Business Machines Corporation which would punch a new series of cards bearing the instrument values.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for recording data comprising, means for sensing the value of said data in terms of voltage, a recorder, a pulse generator for supplying a continuous series of pulses to said recorder, potentiometer means for cyclically sweeping through a voltage varying between certain values and for comparing said sweep voltage with said data voltage, and means for completing a circuit for supplying said pulses from said generator to said recorder when said sweep voltage is at one of said certain values and interrupting said circuit when compared value of voltage is equal to zero.

2. Apparatus for recording data comprising, means for sensing the value of said data in terms of a certain quantity, means for recording discrete effects on a medium, means for scanning said data quantity at said sensing means with a source of said certain quantity varying between certain values, and means for initiating recording of said discrete effects when said scanning quantity is at one of said certain values and a piece of data is being sensed, and interrupting recording of said discrete effects when the compared value of said scanning quantity and said sensed data quantity is equal to zero.

3. Apparatus for recording data comprising, means for sensing the value of said data in terms of a certain quantity, means for recording a series of discrete effects on a medium, each effect representing a predetermined increment of such data, means for scanning said data quantity at said sensing means with a source of said certain quantity varying between certain values, means for initiating recording of said series of discrete effects when said scanning quantity is at one of said certain values and a piece of data is being sensed, interrupting recording of said series of discrete effects when the compared value of said scanning quantity and said sensed data quantity is equal to zero, and means for recording a further series of discrete effects in association with said series of discrete effects for identification thereof.

4. Apparatus for recording samples of data comprising means for sensing the value of said data samples in terms of a certain quantity, means for recording discrete effects on a medium, means for cyclically scanning said samples of data in terms of said quantity at said sensing means with a source of said certain quantity varying from between certain values, means for iniitating recording of a series of said discrete effects whenever said scanning quantity is at said one of said certain values and a sample of data is being sensed, interrupting recording of said series of discrete effects when the compared value of said scanning quantity and said sensed sample of data is equal to zero, and means for recording a further series of discrete effects in association with said series of discrete effects for identification thereof.

5. Apparatus for recording on a medium samples of outputs of a series of instruments comprising, means for cyclically producing a quantity varying between certain values in each cycle and capable of comparison with said outputs, means for connecting and disconnecting said instruments in sequence to said cyclic means at one of said certain values, means for recording discrete effects on a medium, means for initiating recording of a series of said discrete effects by said recording means whenever said cyclic means is at said one of said certain values and interrupting recording of said series of discrete effects when said quantity is equal to and opposite in sign to the output of the instrument which is conected to said cyclic means, further means for recording discrete effects on said medium in association with said first-mentioned discrete effects, and means for initiating recording of a further series of discrete effects by said further means at an instant while said instrument is connected to said cyclic means and for interrupting recording by said further means when a specific number of effects corresponding to said instrument is recorded.

6. Apparatus for recording on a medium samples of outputs of a series of instruments comprising, means for cyclically producing a quantity varying between certain values in each cycle and capable of comparison with said outputs, means for connecting and disconnecting said instruments in sequence to said cyclic means at one of said certain values, means for recording discrete effects on a medium,, means for initiating recording of a series of said discrete effects by said recording means whenever said cyclic means is at said one of said certain values and interrupting recording of said series of discrete effects when said quantity is equal to and opposite in sign to the output of the instrument which is connected to said cyclic means, further means for recording discrete effects on said medium in association with said first-mentioned discrete effects, and means for initiating recording of a further series of discrete effects by said further means at an instant while said instrument is connected to said cyclic means and for interrupting recording by said further means when a specific number of effects corresponding to the sequential position of said instrument has been recorded.

7. Apparatus for recording on a medium samples of outputs of a series of instruments comprising, means for cyclically producing a quantity varying between certain values in each cycle and capable of comparison with said outputs, means for connecting and disconnecting instruments whose outputs are to be recorded in sequence to said cyclic means at one of said certain values, means for providing said discrete effects for recording discrete effects on a medium, energizing means, gate means for effecting energization of said recording means by said energizing means whenever said cyclic means is at said one of said certain values and interrupting said energization when said quantity is equal to and opposite in sign to the output of the instrument which is connected to said cyclic means, further means for recording discrete effects on said medium in association with said first-mentioned discrete effects, and further gate means for effecting energization of said further recording means by said energizing means at an instant while said instrument is connected to said cyclic means and interrupting said further recording when a specific number of effects corresponding to the sequential position of said instrument has been recorded.

8. Apparatus for recording on a magnetic medium samples of outputs of a series of instruments comprising, means for cyclically producing a quantity varying between certain values in each cycle and capable of comparison with said outputs, means for effecting connection and disconnection of instruments whose outputs are to be recorded in sequence to said cyclic means at one of said certain values, means for recording on said medium, a source of pulses, gate means for effecting supply of pulses from said source of said recording means whenever said cyclic means is at said one of said certain values and interrupting said supply when said quantity is equal to and opposite in sign to the output of the instrument which is connected to said cyclic means, further means for recording on said medium in association with said first-mentioned recording means, and further gate means for effecting supply of further pulses from said source to said further recording means at an instant while said instrument is connected to said cyclic means and for effecting interruption of said further supply when a specific number of pulses corresponding to the sequential position of said instrument has been supplied.

9. Apparatus for recording on a medium samples of outputs of a series of instruments which outputs are available in terms of voltage comprising, potentiometer means for cyclically producing a voltage varying from one value at the beginning to a different value at the end of each cycle, means for effecting connection of each such instrument in sequence to said potentiometer means at said beginning of said cycles and disconnection of each such instrument at the end of said cycles, means for recording discrete effects on said medium, a source of energy to provide said discrete effects for said recording means, gate means for effecting supply of energy from said source to said recording means at each of said beginnings and for effecting interruption of said supply when the difference between said potentiometer voltage and the voltage of the instrument connected during the particular cycle is equal to a certain value, further means for recording on said medium in association with said first-mentioned recording means, and further gate means for effecting supply of energy from said source to said further recording means at each of said beginnings and for effecting interruption of said further supply when a specific number of further discrete effects corresponding to the sequential position of said particular instrument has been supplied.

10. Apparatus for recording on a magnetic medium samples of outputs of a series of instruments which outputs are available in terms of voltage comprising, potentiometer means for cyclically producing a voltage varying from one value at the beginning to a different value at the end of each cycle, means for effecting connection of each such instrument in sequence to said potentiometer means at said beginning of said cycles and disconnection of each such instrument at the end of said cycles, means for recording on said medium, a source of pulses, gate means for effecting supply of pulses from said source to said recording means at each of said beginnings and for effecting interruption of said supply when the difference between said potentiometer voltage and the voltage of the instrument connected during the particular cycle is equal to a certain value, further means for recording on said medium in association with said first-mentioned recording means, and further gate means for effecting supply of further pulses from said source to said further recording means at each of said beginnings and for effecting interruption of said further pulses when a specific number of further pulses corresponding to the sequential position of said particular instrument has been supplied.

11. Apparatus for recording on a medium samples of outputs of a series of instruments, which outputs are available in terms of voltage, comprising, a driving motor, potentiometer means to be driven by said motor for cyclically producing a voltage varying from one value at the beginning to another value opposite in sign at the end of each cycle, means to be driven by said motor for effecting connection of each such instrument in sequence to said potentiometer means at said beginnings of said cycles and for effecting disconnection of each such instrument at the ends of said cycles, means for recording a series of pulses on said magnetic medium, a source of energizing pulses, gate means for effecting supply of energizing pulses from said source to said recording means at each of said beginnings and for effecting interruption of said supply when said potentiometer voltage is equal and opposite in sign to the voltage of the instrument connected during the particular cycle.

12. Apparatus for recording on a medium samples of outputs of a series of instruments, which outputs are available in terms of voltage, comprising, a driving motor, potentiometer means to be driven by said motor for cyclically producing a voltage varying from one value at the beginning to another value opposite in sign at the end of each cycle, means to be driven by said motor for effecting connection of each such instrument in sequence to said potentiometer means at said beginnings of said cycles and for effecting disconnection of each such instrument at the ends of said cycles, means for recording pulses on said magnetic medium, a source of energizing pulses, gate means for effecting supply of energizing pulses from said source to said recording means at each of said beginnings and for effecting interruption of said supply when said potentiometer voltage is equal and opposite in sign to the voltage of the instrument connected during the particular cycle, further means for recording on said medium in association with said first-mentioned recording means, and further gate means for effecting supply of further energizing pulses from said source to said further recording means at each of said beginnings and for effecting interruption of said further supply when a specific number of further pulses corresponding to the sequential position of said particular instrument has been supplied.

13. Apparatus for recording on a medium samples of outputs of a series of instruments which outputs are available in terms of voltage comprising, a driving motor, potentiometer means to be driven by said motor for cyclically producing a voltage varying from one value at the beginning to another value opposite in sign at the end of each cycle, means to be driven by said motor for effecting connection of each such instrument in sequence to said potentiometer means at said beginnings of said cycles and for effecting disconnection of each such instrument at the ends of said cycles, means for obtaining in each of said cycles the sum of said potentiometer voltage and the voltage of the instrument connected thereto, means for recording pulses on said medium, a source of energizing pulses, electric valve means responsive to a value other than zero in said sum voltage at the beginning of each of said cycles for effecting supply of energizing pulses to said recording means and responsive to a value of zero in said sum voltage for effecting interruption of said supply of energizing pulses, further means for recording pulses on said medium in association with said first-mentioned recording means, switch means to be actuated by said motor and having operating intervals each of which is correlated with the sequential position of a particular instrument for effecting supply of further energizing pulses from said source to said further recording means during each of said cycles.

14. Apparatus for recording on a medium samples of outputs of a series of instruments which outputs are available in terms of voltage comprising, a driving motor, potentiometer means to be driven by said motor for cyclically producing a voltage varying from one value at the beginning to another value opposite in sign at the end of each cycle, means to be driven by said motor for effecting connection of each such instrument in sequence to said potentiometer means at said beginnings of said cycles and for effecting disconnection of each such instrument at the ends of said cycles, means for obtaining in each of said cycles the sum of said potentiometer voltage and the voltage of the instrument connected thereto, means for recording pulses on said medium, a source of energizing pulses, electric valve means responsive to a value other than zero in said sum voltage at the beginning of each of said cycles for effecting supply of energizing pulses to said recording means and responsive to a value of zero in said sum voltage for effecting interruption of said supply of energizing pulses, further means for recording pulses on said medium in association with said first-mentioned recording means, and switch means to be actuated by said motor and having successively longer operating intervals one each of which is correlated with the sequential position of a particular instrument for effecting supply of further energizing pulses from said source to said further recording means during each of said cycles.

15. Apparatus for recording on a medium samples of outputs of a series of instruments which outputs are available in terms of voltage comprising, a driving motor, potentiometer means to be driven by said motor for cyclically producing a voltage varying from one value at the beginning to another value opposite in sign at the end of each cycle, means to be driven by said motor for effecting connection of each such instrument in sequence to said potentiometer means at said beginnings of said cycles and for effecting disconnection of each such instrument at the ends of said cycles, means for obtaining in each of said cycles the sum of said potentiometer voltage and the voltage of the instrument connected thereto, means for recording pulses on said medium, a source of energizing pulses, electric valve means responsive to a value other than zero in said sum voltage at the beginning of each of said cycles for effecting supply of energizing pulses to said recording means and responsive to a value of zero in said sum voltage for effecting interruption of said supply of energizing pulses, further means for recording pulses on said medium in association with said first-mentioned recording means, and electric valve means having operating intervals each one of whose length is correlated with the sequential position of a particular instrument for effecting supply of further energizing pulses from said source to said further recording means during each of said cycles.

16. Apparatus for recording on a medium samples of outputs of a series of instruments which outputs are available in terms of voltage comprising, a driving motor, potentiometer means to be driven by said motor for cyclically producing a voltage varying from one value at the beginning to another value opposite in sign at the end of each cycle, means to be driven by said motor for effecting connection of each such instrument in sequence to said potentiometer means at said beginnings of said cycles and for effecting disconnection of each such instrument at the ends of said cycles, means for obtaining in each of said cycles the sum of said potentiometer voltage and the voltage of the instrument connected thereto, means for recording pulses on said medium, a source of energizing pulses to be driven by said motor whereby the rate of pulse generation is determined by the motor speed, electric valve means responsive to a value other than zero in said sum voltage at the beginning of each of said cycles for effecting supply of energizing pulses to said recording means and responsive to a value of zero in said sum voltage for effecting interruption of said supply of energizing pulses, further means for recording pulses on said medium in association with said first-mentioned recording means, switch means to be actuated by said motor and having operating intervals each one of which is correlated with the sequential position of a particular instrument for effecting supply of further energizing pulses from said source to said further recording means during each of said cycles.

17. Apparatus for recording on a medium samples of outputs of a series of instruments which outputs are available in terms of voltage comprising, a driving motor, a slide wire potentiometer to be driven by said motor for cyclically producing a voltage varying from one value at the beginning to another value opposite in sign at the end of each cycle, means to be driven by said motor for effecting connection of each such instrument in sequence to said potentiometer at said beginnings of said cycles and for effecting disconnection of each such instrument at the ends of said cycles, means for obtaining in each of said cycles the sum of said potentiometer voltage and the voltage of the instrument connected thereto, means for amplifying said sum voltage, means for recording pulses on said medium, means for moving said medium past said recording means, a source of energizing pulses to be driven by said motor whereby the rate of pulse generation is determined by the motor speed, electric valve means controlled by said amplified sum voltage and responsive to a value other than zero in said sum voltage at the beginning of each of said cycles for effecting supply of energizing pulses from said source to said recording means and responsive to a value of zero in said sum voltage for effecting interruption of said supply of energizing pulses, further means for recording pulses on said medium in association with said first-mentioned recording means, and switch means to be actuated by said motor and having operating intervals each one of which is correlated with the sequential position of a particular instrument for effecting supply of further energizing pulses from said source to said further recording means during each of said cycles.

18. Apparatus for recording on a medium samples of outputs of a series of instruments which outputs are available in terms of a D. C. voltage comprising, a driving motor, a slide wire potentiometer to be driven by said motor for cyclically producing a D. C. voltage varying from one value at the beginning to another value opposite in sign at the end of each cycle, means to be driven by said motor for effecting connection of each such instrument in sequence to said potentiometer at said beginnings of said cycles and for effecting disconnection of each such instrument at the ends of said cycles, means for obtaining in each of said cycles the sum of said D. C. potentiometer voltage and the D. C. voltage of the instrument connected thereto, means for converting said sum voltage into an alternating voltage, means for amplifying said alternating voltage, means for recording pulses on said medium, means for moving said medium past said recording means, a source of energizing pulses to be driven by said motor whereby the rate of pulse generation is determined by said motor speed, electric valve means controlled by said amplified sum alternating voltage and responsive to a value of said sum voltage other than a predetermined value at the beginning of each of said cycles for effecting supply of energizing pulses from said source to said recording means and responsive to a value of said sum voltage equal to said predetermined value for effecting interruption of said supply of energizing pulses, further means for recording pulses on said medium in association with said first-mentioned recording means, and switch means to be actuated by said motor and having operating intervals each one of which is correlated with the sequential position of a particular instrument for effecting supply of further energizing pulses from said source of said further recording means during each of said cycles.

19. Apparatus for reproducing data on one medium in the form of groups of discrete effects, the number of which effects in each group represents one sample of data and each effect represents a predetermined increment of said data, into a readily readable form on another medium comprising, means for sensing said discrete effects, means for counting the total number of said sensed discrete effects, means for remembering a signal combination corresponding to the total number of said counted discrete effects, and means controlled by said signal combination for making a readily readable record on said other medium.

20. Apparatus for reproducing data on one medium in the form of groups of discrete effects, the number of which effects in each group represents one sample of data and each effect represents a predetermined increment of said data, into a readily readable form on another medium comprising, means for sensing said discrete effects, means for counting the total number of said sensed discrete effects, means for remembering a signal combination corresponding to the number of said counted discrete effects, and means controlled by said signal combination for punching a card with a readable form of one sample of data.

21. Apparatus for reproducing data on one medium in the form of groups of discrete effects, the number of which effects in each group represents one sample of data and each effect represents a predetermined increment of said data, into a readily readable form on another medium comprising, means for sensing said discrete effects, means for counting the total number of said sensed discrete effects, means for remembering a signal combination corresponding to the number of said counted discrete effects, and means controlled by said signal combination for making punches on a card opposite characters the group of which punches indicates the number of said discrete effects.

22. Apparatus for reproducing data on one medium, in the form of groups of discrete effects, the number of which effects in each group represents one sample of data and each effect represents a predetermined increment of said data, into a readily readable form on another medium comprising, means for sensing said discrete effects, means for counting the total number of said sensed discrete effects, means for remembering a signal combination corresponding to the number of said counted discrete effects, and means controlled by said signal combination for impressing on another medium in readable form the number of said discrete effects.

23. Apparatus for reproducing data on one medium in the form of groups of discrete effects, the number of which effects in each group representing one sample of data and each effect represents a predetermined increment of said data, into a readily readable form on another medium comprising; means for continuously sensing said discrete effects; means for counting the total number of said sensed discrete effects; a pair of memory means, each for remembering a signal combination corresponding to the number of counted discrete effects in any group, to be connected alternately to said counting means; and means to be connected alternately to each of said memory means and controlled by the signal combination being remembered for impressing on another medium, in readable form, the number of said discrete effects.

24. Apparatus for reproducing data on one medium in the form of groups of discrete effects, the number of which effects in each group representing one sample of data and each effect represents a predetermined increment of said data, into a readily readable form on another medium comprising; means for continuously sensing said discrete effects; means for counting the total number of said sensed discrete effects; a pair of memory means, each for remembering a signal combination corresponding to the number of counted discrete effects in any group, to be connected alternately to said counting means; and means to be connected alternately to each of said memory means and controlled by the signal combination being remembered for making punches opposite characters on a separate card for each of said groups the total of which punches indicates the number of said discrete effects in each group.

25. Apparatus for reproducing information and identification data on one medium in the form of a series of associated groups of discrete effects, the number of which effects in at least one group of such associated groups representing one sample of information and the number of which effects in another group of such associated groups representing the identity of such one sample of information, into a readily readable form on another medium comprising, means for continuously sensing and counting the discrete effects of at least one series of information groups and one series of corresponding identification groups; a first pair of memory means, each for remembering a signal combination corresponding to the number of counted discrete effects in any information group, to be connected alternately to said sensing and counting means; a second pair of memory means, each for remembering a signal combination corresponding to the number of counted discrete effects in the associated identification group to be connected alternately to said sensing and counting means; and means to be connected alternately to each of said first pair of memory means and controlled by the signal combination being remembered thereby for impressing on another medium, in readable form, the number of discrete effects of each information group, said last-mentioned means to be further connected alternately to each of said second pair of memory means and controlled by the signal combination being remembered thereby for impressing on said other medium, in readable form, the number of discrete effects of each identification group associated with a particular information group.

26. Apparatus for reproducing information and identification data on one medium in the form of a series of associated groups of discrete effects, the number of which effects in at least one group of such associated groups representing one sample of information and the number of which effects in another group of such associated groups representing the identity of such one sample of information, into a readily readable form on another medium comprising, means for continuously sensing and counting the discrete effects of at least one series of information groups and one series of corresponding identification groups; a first pair of memory means, each for remembering a signal combination corresponding to the number of counted discrete effects in any information group, to be connected alternately to said sensing and counting means; a second pair of memory means, each for remembering a signal combination corresponding to the number of counted discrete effects in the associated identification group, to be connected alternately to said sensing and counting means; and means to be connected alternately to each of said first pair of memory means and controlled by the signal combination being remembered thereby for making punches opposite characters on a card for each of said information groups the total of which punches indicates the number of discrete effects of each information group, said last-mentioned means to be further connected alternately to each of said second pair of memory means and controlled by the signal combination being remembered thereby for making punches opposite characters on said card for each of said identification groups the total of which punches indicates the number of discrete effects of each identification group associated with a particular information group.

27. Apparatus for reproducing data on one medium in the form of groups of discrete effects, the number of which effects in each group representing one sample of data, into a readily readable form on another medium comprising; means for continually sensing and counting said discrete effects; a pair of memory means, each for remembering a signal combination corresponding to the number of sensed and counted discrete effects in any group, to be connected alternately to said sensing and counting means; means responsive to sensing the end of discrete effects in the group thereof being sensed and counted for causing the one of said pair of memory means connected to said sensing and counting means to be disconnected therefrom and the other one of said pair of memory means to be connected thereto; means to be connected alternately to each of said memory means and controlled by the signal combination being remembered for impressing on another medium, in readable form, the number of said discrete effects; and means responsive to the end of impressing a particular sample of data for causing the one of said memory means connected to said impressing means to be disconnected therefrom and the other one of said memory means to be connected thereto.

28. Apparatus for reproducing information and identification data on a medium, in the form of a series of associated groups of discrete effects, the number of such effects in at least one group of such associated groups representing one sample of information and the number of such effects in another group of such associated groups representing the identity of such one sample of information, into readily readable form on another medium comprising; means for continuously sensing and counting the discrete effects of at least one series of information groups and one series of associated identification groups; a first pair of memory means, each for remembering a signal combination corresponding to the number of counted discrete effects in any information group, to be connected alternately to said sensing and counting means; a second pair of memory means, each for remembering a signal combination corresponding to the number of sensed and counted discrete effects in the associated identification group, to be connected alternatively to said sensing and counting means; means responsive to sensing the end of discrete effects in the associated information group and identification group being sensed and counted for causing the ones of said first and second pairs of memory means connected to said sensing and counting means to be disconnected therefrom and the other ones of said first and second pairs of memory means to be connected thereto; means to be connected alternately to each of said first pair of memory means and controlled by the signal combination being remembered thereby for impressing on another medium, in readable form, the number of discrete effects of each information group, said last-mentioned means to be further connected alternately to each of said second pair of memory means and controlled by the signal combination being remembered thereby for impressing on said other medium, in readable form, the number of discrete effects of each identification group associated with a particular information group; and means responsive to the end of impressing a particular sample of information and identification for causing the ones of said first and second pairs of memory means connected to said impressing means to be disconnected therefrom and the other one of said first and second pairs of memory means to be connected thereto.

29. Apparatus for transcribing information and identification data on a medium, in the form of a series of associated groups of discrete effects, the number of such effects in at least one group of such associated groups representing one sample of information and the number of such effects in another group of such associated groups representing the identity of such one sample of information, into readily readable form on another medium comprising; means for continuously sensing and counting the discrete effects of at least one series of information groups and one series of associated identification groups; a first pair of memory means, each for remembering a signal combination corresponding to the number of counted discrete effects in any information group, to be connected alternately to said sensing and counting means; a second pair of memory means, each for remembering a signal combination corresponding to the number of sensed and counted discrete effects in the associated identification group, to be connected alternately to said sensing and counting means; means responsive to sensing the end of discrete effects in the associated information group and identification group being sensed and counted for causing the ones of said first and second pairs of memory means connected to said sensing and counting means to be disconnected therefrom and the other ones of said first and second pairs of memory means to be connected thereto; means to be connected alternately to each of said first pair of memory means and controlled by the signal combination being remembered thereby for making punches opposite characters on a card for each of said information groups the total of which punches indicates the number of discrete effects of each information group, said last-mentioned means to be further connected alternately to each of said second pair of memory means and controlled by the signal combination being remembered thereby for making punches opposite characters on said card for each of said identification groups the total number of which punches indicates the number of discrete effects of each identification group associated with a particular information group; and means responsive to the end of impressing a particular sample of information and identification for causing the ones of said first and second pairs of memory means connected to said impressing means to be disconnected therefrom and the other ones of said first and second pairs of memory means to be connected thereto.

30. Apparatus for transcribing information and identification data on a medium, in the form of a series of associated groups of discrete effects, the number of such effects in at least one group of such associated groups representing one sample of information and the number of such effects in another group of such associated groups representing the identity of such one sample of information, into readily readable form on another medium comprising; means for continuously sensing and counting the discrete effects of at least one series of information groups and one series of associated identification groups; a first pair of memory means, each for remembering a signal combination corresponding to the number of counted discrete effects in any information group, to be connected alternately to said sensing and counting means; a second pair of memory means, each for remembering a signal combination corresponding to the number of sensed and counted discrete effects in the associated identification group, to be connected alternately to said sensing and counting means; first means responsive to sensing the end of discrete effects in the associated information group and identification group being sensed and counted for causing the ones of said first and second pairs of memory means connected to said sensing and counting means to be disconnected therefrom and the other ones of said first and second pairs of memory means to be connected thereto; said first responsive means producing a first signal when said disconnection and said connection have occurred; means to be connected alternately to each of said first pair of memory means and controlled by the signal combination being remembered thereby for making punches opposite characters on a card for each of said information groups the total of which punches indicates the number of discrete effects of each information group, said last-mentioned means to be further connected alternately to each of said second pair of memory means and controlled by the signal combination being remembered thereby for making punches opposite characters on said card for each of said identification groups the total number of which punches indicates the number of discrete effects of each identification group associated with a particular information group; and second means responsive to the end of impressing a particular sample of information and identification for causing the ones of said first and second pairs of memory means connected to said impressing means to be disconnected therefrom and the other ones of said first and second pair of memory means to be connected thereto, said second responsive means producing a second signal when said disconnection and said connection have occurred; and means combining said first and said second signals to initiate operation of said punch-making means.

31. Apparatus for transcribing information and identification data on a magnetic medium, in the form of a series of associated groups of magnetic pulses, the number of such magnetic pulses in at least one group of such associated groups representing one sample of information and the number of such magnetic pulses in another group of such associated groups representing the identity of such one sample of information, into readily readable form on another medium comprising; means for continuously sensing and counting the magnetic pulses of at least one series of information groups and one series of associated identification groups; a first pair of electronic valve memory means, each for remembering a signal combination corresponding to the number of counted magnetic pulses in any information group, to be connected alternately to said sensing and counting means; a second pair of electronic valve memory means, each for remembering a signal combination corresponding to the number of sensed and counted magnetic pulses in the associated identification group; first electric relay means responsive to sensing the end of magnetic pulses in the associated information group and identification group being sensed and counted for causing the ones of said first and second pairs of memory means connected to said sensing and counting means to be disconnected therefrom and the other ones of said first and second pairs of memory means to be connected thereto; said first responsive means producing a first signal when said disconnection and said connection have occurred; means to be connected alternately to each of said first pair of memory means and controlled by the signal combination being remembered thereby for making punches opposite characters on a card for each of said information groups the total of which punches indicates the number of magnetic pulses of each information group, said last-mentioned means to be further connected alternately to each of said second pair of memory means and controlled by the signal combination being remembered thereby for making punches opposite characters on said card for each of said identification groups the total number of which punches indicates the number of magnetic pulses of each identification group associated with a particular information group; and second electric relay means responsive to the end of impressing a particular sample of information and identification for causing the ones of said first and second pairs of memory means connected to said impressing means to be disconnected therefrom and the other ones of said first and second pairs of memory means to be connected thereto, said second responsive means producing a second signal when said disconnection and said connection have occurred; and means combining said first and said second signals to initiate operation of said punch-making means.

References Cited in the file of this patent

UNITED STATES PATENTS

| | | |
|---|---|---|
| 1,919,409 | Armstrong | July 25, 1933 |
| 2,116,372 | Weld | May 3, 1938 |
| 2,139,655 | Allensworth | Dec. 13, 1938 |
| 2,207,743 | Larson et al. | July 16, 1940 |
| 2,279,232 | Graham | Apr. 7, 1942 |
| 2,370,989 | Nichols | Mar. 6, 1945 |
| 2,432,902 | Jones et al. | Dec. 16, 1947 |
| 2,489,253 | Andre | Nov. 29, 1949 |
| 2,510,061 | Branson et al. | June 6, 1950 |
| 2,534,841 | Wallace | Dec. 19, 1950 |
| 2,549,401 | Stein et al. | Apr. 17, 1951 |
| 2,574,696 | Fischler | Nov. 13, 1951 |
| 2,579,831 | Keinath | Dec. 25, 1951 |
| 2,609,050 | Roth | Sept. 2, 1952 |
| 2,623,936 | Kennedy et al. | Dec. 30, 1952 |
| 2,680,241 | Gridley | June 1, 1954 |